United States Patent
Yu et al.

(10) Patent No.: US 12,055,407 B2
(45) Date of Patent: Aug. 6, 2024

(54) MIXED REGULAR AND OPEN-SPACE TRAJECTORY PLANNING METHOD FOR AUTONOMOUS DRIVING VEHICLE

(71) Applicant: Baidu USA LLC, Sunnyvale, CA (US)

(72) Inventors: Ning Yu, Beijing (CN); Fan Zhu, Sunnyvale, CA (US); Jingjing Xue, Beijing (CN)

(73) Assignees: BAIDU USA LLC, Sunnyvale, CA (US); BAIDU.COM TIMES TECHNOLOGY (BEIJING) CO., LTD., Beijing (CN)

(*) Notice: Subject to any disclaimer, the term of this patent is extended or adjusted under 35 U.S.C. 154(b) by 256 days.

(21) Appl. No.: 16/646,961

(22) PCT Filed: Feb. 26, 2020

(86) PCT No.: PCT/CN2020/076817
§ 371 (c)(1),
(2) Date: Mar. 12, 2020

(87) PCT Pub. No.: WO2021/168698
PCT Pub. Date: Sep. 2, 2021

(65) Prior Publication Data
US 2021/0262819 A1     Aug. 26, 2021

(51) Int. Cl.
*G01C 21/36* (2006.01)
*G01C 21/34* (2006.01)

(52) U.S. Cl.
CPC ....... *G01C 21/3658* (2013.01); *G01C 21/343* (2013.01); *G01C 21/3446* (2013.01); *G01C 21/3602* (2013.01)

(58) Field of Classification Search
CPC .............. G01C 21/3658; G01C 21/343; G01C 21/3446; G01C 21/3602; G01C 21/3407
See application file for complete search history.

(56) References Cited

U.S. PATENT DOCUMENTS

| | | | |
|---|---|---|---|
| 2010/0292916 A1 | 11/2010 | Kurciska et al. | |
| 2010/0299013 A1* | 11/2010 | Dolgov | G05D 1/0274 701/25 |

(Continued)

FOREIGN PATENT DOCUMENTS

| | | |
|---|---|---|
| CN | 101719316 A | 6/2010 |
| CN | 105844716 A | 8/2016 |

(Continued)

OTHER PUBLICATIONS

"Exponential Distribution", Wikipedia, Dec. 12, 2019 (Year: 2019).

(Continued)

*Primary Examiner* — Jess Whittington
*Assistant Examiner* — Brian E Yang
(74) *Attorney, Agent, or Firm* — WOMBLE BOND DICKINSON (US) LLP

(57) ABSTRACT

A computer-implement method for operating an ADV is disclosed. A starting point and an ending point of a route along which an ADV is to be driven is determined. Whether each of the starting point and the ending point is within a first driving area having a lane boundary or a second driving area as an open space is determined. The route is divided into a first route segment and a second route segment. Dependent upon whether the starting point or the ending point is within the first driving area or the second driving area, the method comprises operating in one of an on-lane mode or an open-space mode to plan a first trajectory for the first route segment and operating in one of the on-lane mode or the open-space mode to plan a second trajectory for the second route segment.

22 Claims, 19 Drawing Sheets

(56) References Cited

U.S. PATENT DOCUMENTS

| | | | |
|---|---|---|---|
| 2012/0029804 A1* | 2/2012 | White | G01C 21/3446 |
| | | | 701/455 |
| 2016/0071418 A1 | 3/2016 | Oshida et al. | |
| 2018/0004206 A1* | 1/2018 | Iagnemma | B60W 50/0098 |
| 2018/0308359 A1 | 10/2018 | Hayakawa | |
| 2018/0314259 A1 | 11/2018 | Shami | |
| 2019/0080266 A1 | 3/2019 | Zhu et al. | |
| 2019/0196485 A1 | 6/2019 | Li et al. | |
| 2019/0320867 A1 | 10/2019 | Noh et al. | |
| 2020/0124435 A1 | 4/2020 | Edwards | |
| 2021/0163010 A1 | 6/2021 | Takabayashi | |
| 2021/0192748 A1* | 6/2021 | Morales Morales | |
| | | | G05D 1/0021 |

FOREIGN PATENT DOCUMENTS

| | | |
|---|---|---|
| CN | 107633694 A | 1/2018 |
| CN | 108716201 A | 10/2018 |
| CN | 108803594 A | 11/2018 |
| CN | 108960468 A | 12/2018 |
| CN | 109101022 A | 12/2018 |
| CN | 109131318 A | 1/2019 |
| CN | 109407673 A | 3/2019 |
| CN | 109489675 A | 3/2019 |
| CN | 109890676 A | 6/2019 |
| CN | 109947090 A | 6/2019 |
| CN | 110096059 A | 8/2019 |
| CN | 110389581 A | 10/2019 |
| CN | 110389583 A | 10/2019 |
| CN | 110487289 A | 11/2019 |
| CN | 110667591 A | 1/2020 |
| DE | 102016219341 A1 | 4/2018 |
| DE | 102018206743 A1 | 5/2018 |
| EP | 3367363 A1 | 8/2018 |
| JP | 2011156955 A | 8/2011 |
| JP | 2017204151 A | 11/2017 |
| JP | 2018112461 A | 7/2018 |
| JP | 2019214273 A | 12/2019 |
| KR | 101660162 B1 | 10/2016 |
| WO | 2019014277 A1 | 1/2019 |

OTHER PUBLICATIONS

Isaiah David, Demand Media "How to Calculate Travel Distance & Time" Aug. 29, 2018, USA Today Online (Year: 2012).

Miura Jet AL: "Mobile robot motion planning considering the motion uncertainty of moving obstacles", Systems, Man, and Cybernetics, 1999. IEEE SMC '99 Conference Proceedin GS. 1999 Ifff International Conference on Tokyo, Japan Oct. 12-15, 1999, 6 pages.

\* cited by examiner

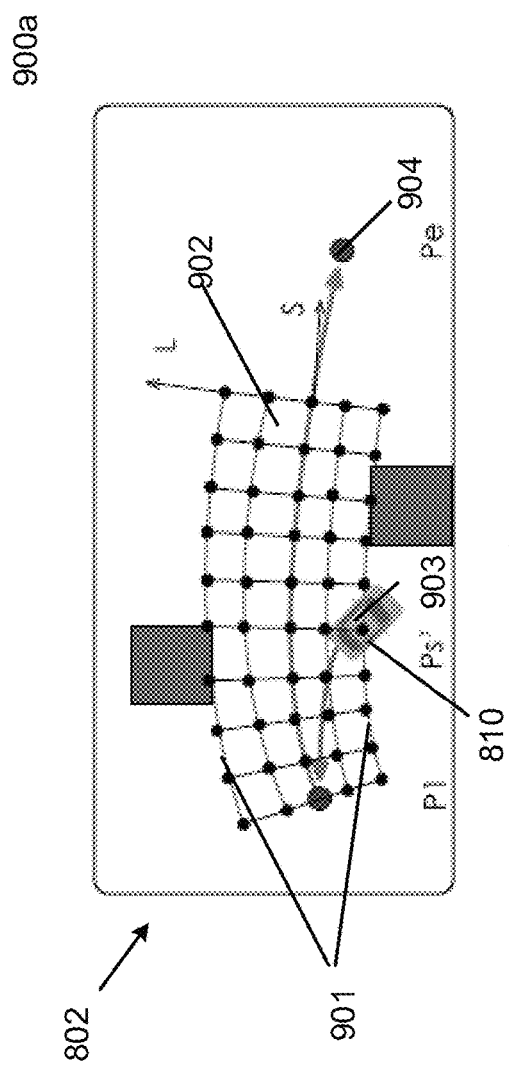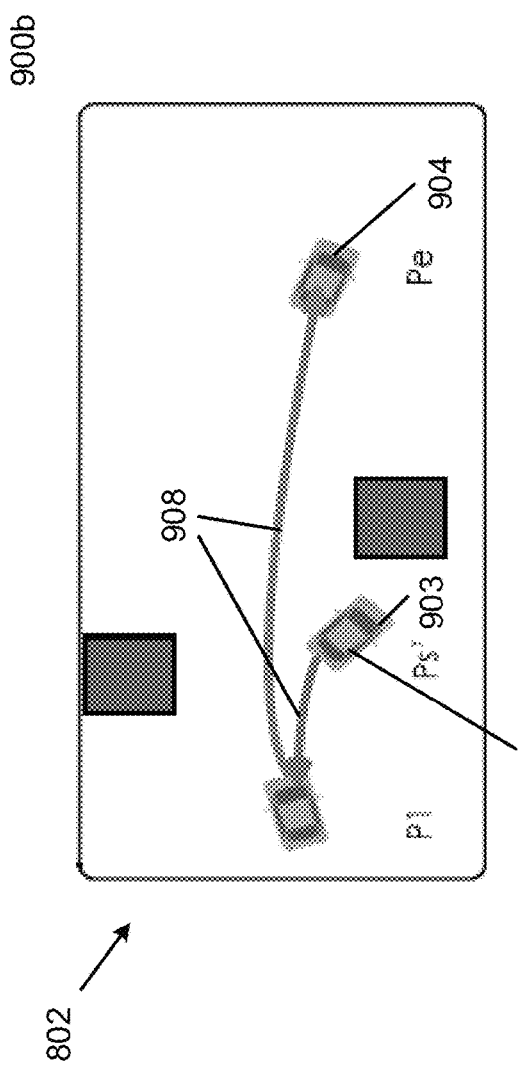
FIG. 9A
FIG. 9B

MIXED REGULAR AND OPEN-SPACE TRAJECTORY PLANNING METHOD FOR AUTONOMOUS DRIVING VEHICLE

CROSS-REFERENCE TO RELATED APPLICATION

This patent application is a U.S. National Phase Application under 35 U.S.C. § 371 of International Application No. PCT/CN2020/076817, filed Feb. 26, 2020, entitled "A MIXED REGULAR AND OPEN-SPACE TRAJECTORY PLANNING METHOD FOR AUTONOMOUS DRIVING VEHICLE," which is incorporated by reference herein by its entirety.

TECHNICAL FIELD

Embodiments of the present disclosure relate generally to operating autonomous vehicles. More particularly, embodiments of the disclosure relate to a trajectory planning method for an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The ADV may need to drive in both road driving scenarios with lane boundaries and free space driving scenarios without lane boundaries. Conventional motion planning method for road driving scenarios may require a topology map and specific road boundaries. Thus, the conventional motion planning method for road driving scenarios is difficult to deal with the complex scenarios such as parking, three-points-turn and obstacles avoidance with a combination of forward and backward trajectories. Conventional free space path planning method is slow to generate a trajectory in real-time, and may lead to a poor performance in obstacle avoidance.

BRIEF DESCRIPTION OF THE DRAWINGS

Embodiments of the disclosure are illustrated by way of example and not limitation in the figures of the accompanying drawings in which like references indicate similar elements.

FIGS. 9A-9B illustrate detailed operations of operating in an open-space mode according to one embodiment.

DETAILED DESCRIPTION

Figure 1:
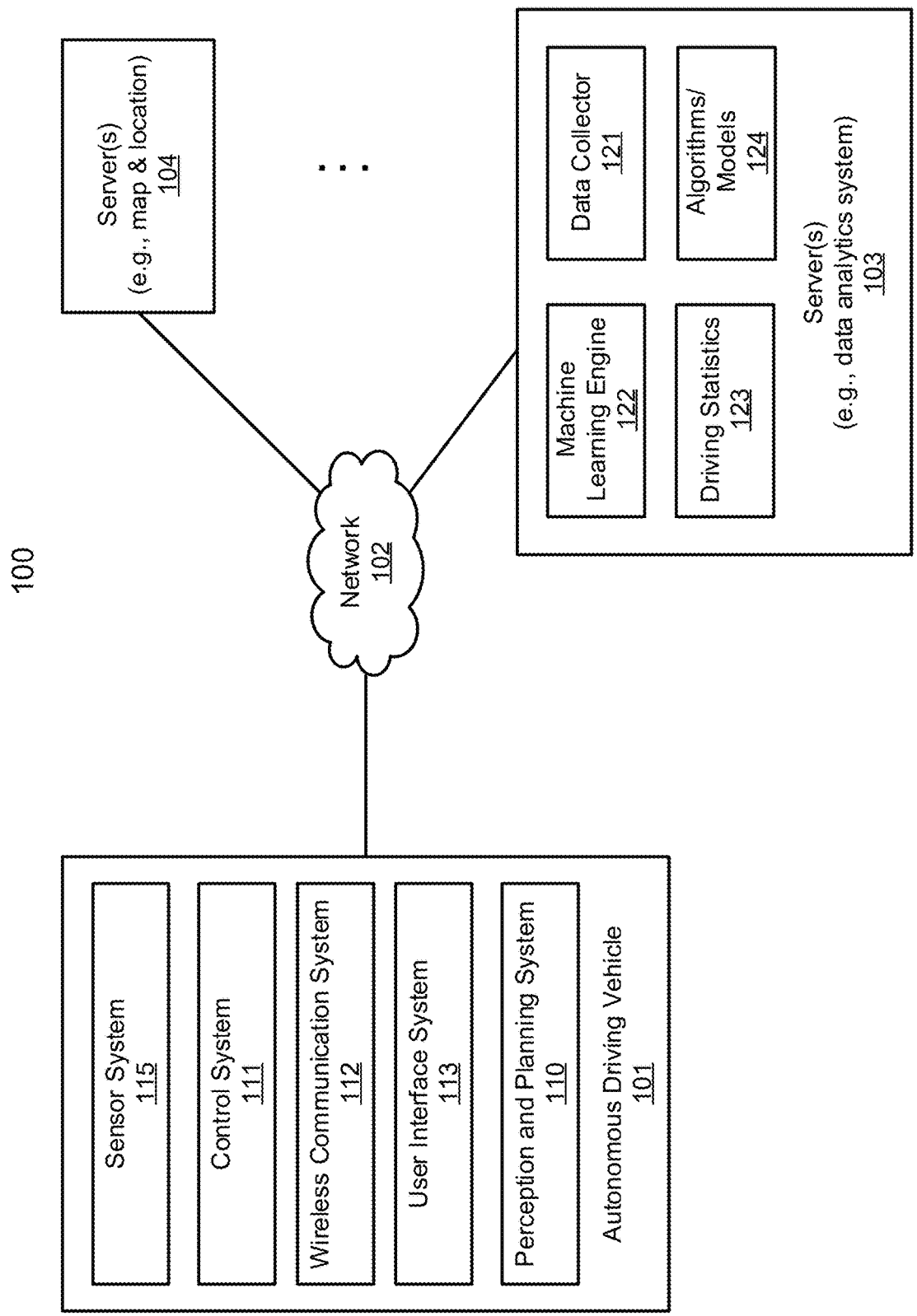
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method for trajectory planning suitable for both a city road with a specified road boundary (also referred to as on-lane planning) and a free space area (also referred to as open-space planning) is disclosed herein. This method gives a combination of A* (e.g., A* and A-star are used interchangeable hereinafter) searching algorithm and hybrid A* searching algorithm for navigation path searching according to different type of driving scenarios. For a city road, A* searching algorithm may be used to get to a navigation path, and for a free open-space, a hybrid A* searching algorithm may be used. The navigation path with A-star (A*) searching algorithm and/or hybrid A-star searching algorithm may be used to generate a reference line for real-time trajectory planning with Dynamic Programming (DP) or Quadratic Programming (QP) algorithm. This trajectory planning method can be used to deal with complex driving tasks, such as driving from a city road to a free space area or driving from a free space to a city road. The method may have a good performance in obstacles avoidance.

According to one embodiment, a computer-implement method for operating an ADV is disclosed. A starting point and an ending point of a route along which an ADV is to be driven is determined. Whether each of the starting point and the ending point is within a first driving area of a first type having a lane boundary or a second driving area of a second type of driving area as an open space that is without a lane boundary is determined. The route is divided into a first route segment and a second route segment based on the determining whether each of the starting point and the ending point is within the first driving area or the second driving area. Dependent upon whether the starting point or the ending point is within the first driving area or the second driving area, the method comprises operating in one of an on-lane mode or an open-space mode to plan a first trajectory for the first route segment and operating in one of the on-lane mode or the open-space mode to plan a second trajectory for the second route segment.

In one embodiment, the starting point is within the first driving area and the ending point is within the second driving area is determined. The method comprises operating in the on-lane mode to plan a first trajectory for the first route segment and operating in the open-space mode to plan a second trajectory for the second route segment, in response to determining the starting point is within the first driving area and the ending point is within the second driving area. For example, an intermediate point that is a nearest point to the end point and positioned within the first driving area is determined, where the first route segment is from the start point to the intermediate point and the second route segment is from the intermediate point to the end point.

In one embodiment, the starting point is within the second driving area and the ending point is within the first driving area is determined. The method comprises operating in the open-space mode to plan a first trajectory for the first route segment and operating in the on-lane mode to plan a second trajectory for the second route segment, in response to determining the starting point is within the second driving area and the ending point is within the first driving area. For example, an intermediate point that is a nearest point to the start point and positioned within the first driving area is determined, where the first route segment is from the start point to the intermediate point and the second route segment is from the intermediate point to the end point.

In one embodiment, the starting point is within the first driving area and the ending point is within the first driving area is determined. The method comprises operating in the on-lane mode to plan a first trajectory for the first route segment and operating in the on-lane mode to plan a second trajectory for the second route segment, in response to determining the starting point is within the first driving area and the ending point is within the first driving area.

In one embodiment, the starting point is within the second driving area and the ending point is within the second driving area is determined. The method comprises operating in the open-space mode to plan a first trajectory for the first route segment and operating in the open-space mode to plan a second trajectory for the second route segment, in response to determining the starting point is within the second driving area and the ending point is within the second driving area.

In one embodiment, operating in the on-lane mode includes searching for the first route segment or the second route segment based on A-star searching algorithm; generating a reference line based on the first route segment or the second route segment; generating a grid based on the reference line; determining a set of candidate trajectories based on the grid; and selecting a trajectory from the set of candidate trajectories to control the ADV to autonomously drive according to the trajectory.

In one embodiment, operating in the open-space mode includes searching for the first route segment or the second route segment based on a modified A-star searching algorithm; generating a reference line based on the first route segment or the second route segment; generating a virtual road boundary based on a width of the ADV and the reference line; generating a grid within the virtual road boundary; determining a set of candidate trajectories based on the grid; and selecting a trajectory from the set of candidate trajectories to control the ADV to autonomously drive according to the trajectory.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
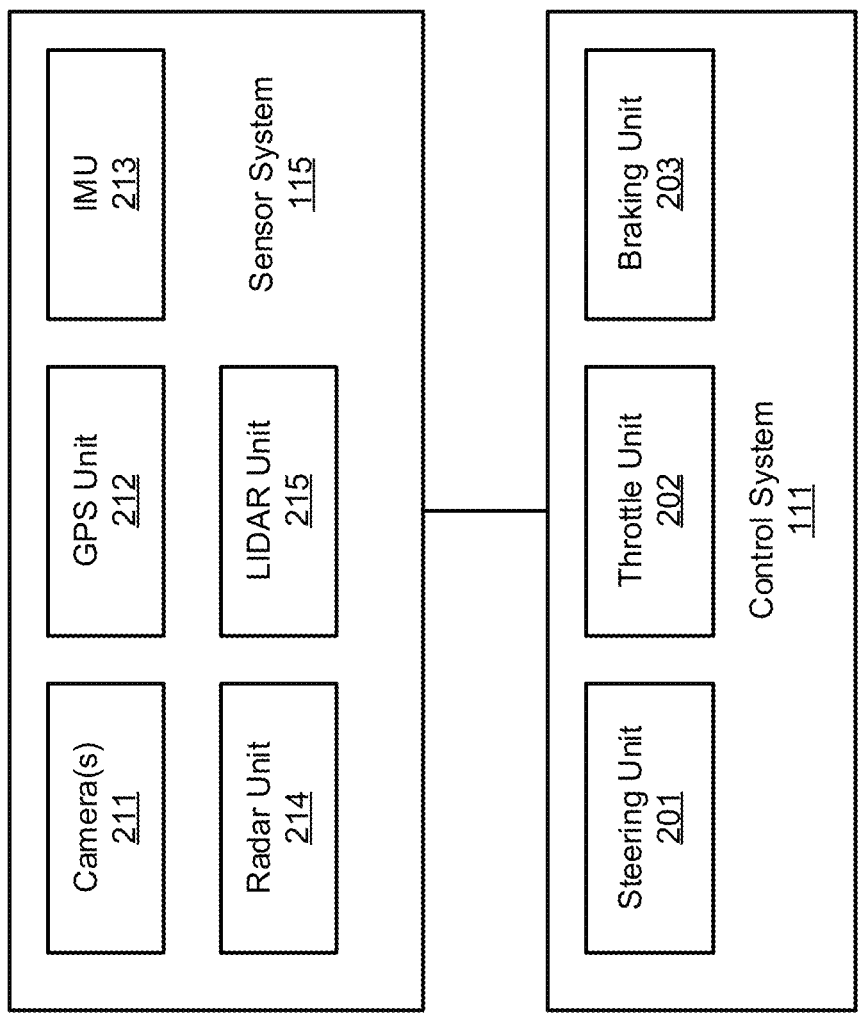
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to determine a starting point and an ending point of a route along which the ADV is to be driven, an algorithm to determine whether each of the starting point and the ending point is within a first driving area having a lane boundary or a second driving area as an open space that is without a lane boundary, an algorithm to divide the route into a first route segment and a second route segment based on the determining whether each of the starting point and the ending point is within the first driving area or the second driving area, and an algorithm to operate in one of an on-lane mode or an open-space mode to plan a first trajectory for the first route segment and operating in one of the on-lane mode or the open-space mode to plan a second trajectory for the second route segment, dependent upon whether the starting point or the ending point is within the first driving area or the second driving area. Algorithms 124 can then be uploaded on ADVs (e.g., models 313 of FIG. 3A) to be utilized during autonomous driving in real-time.

Figure 3A:
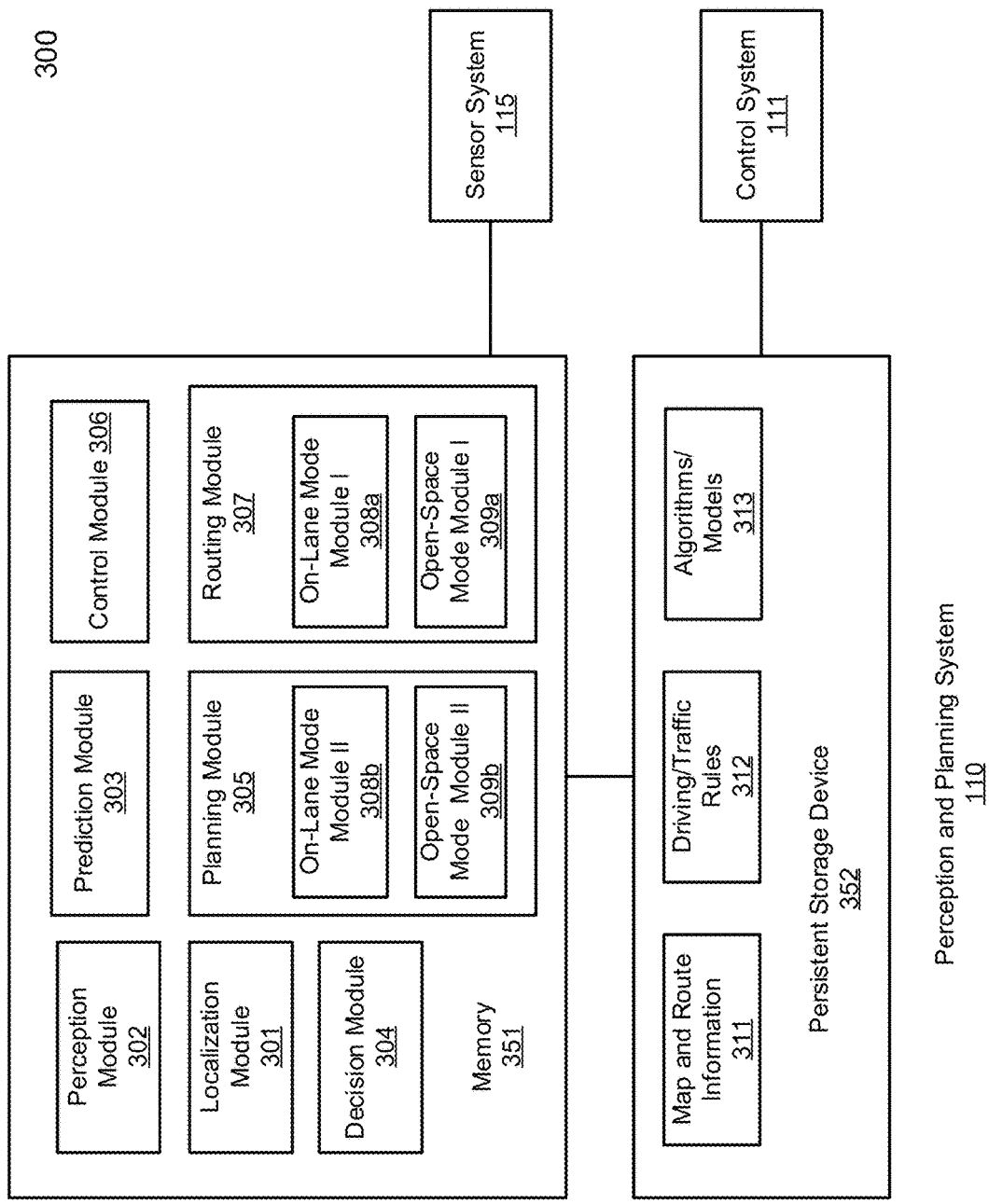
FIGS. 3A-3B are block diagrams illustrating an example of a perception and planning system used with an autonomous vehicle according to one embodiment.
Figure 3B:
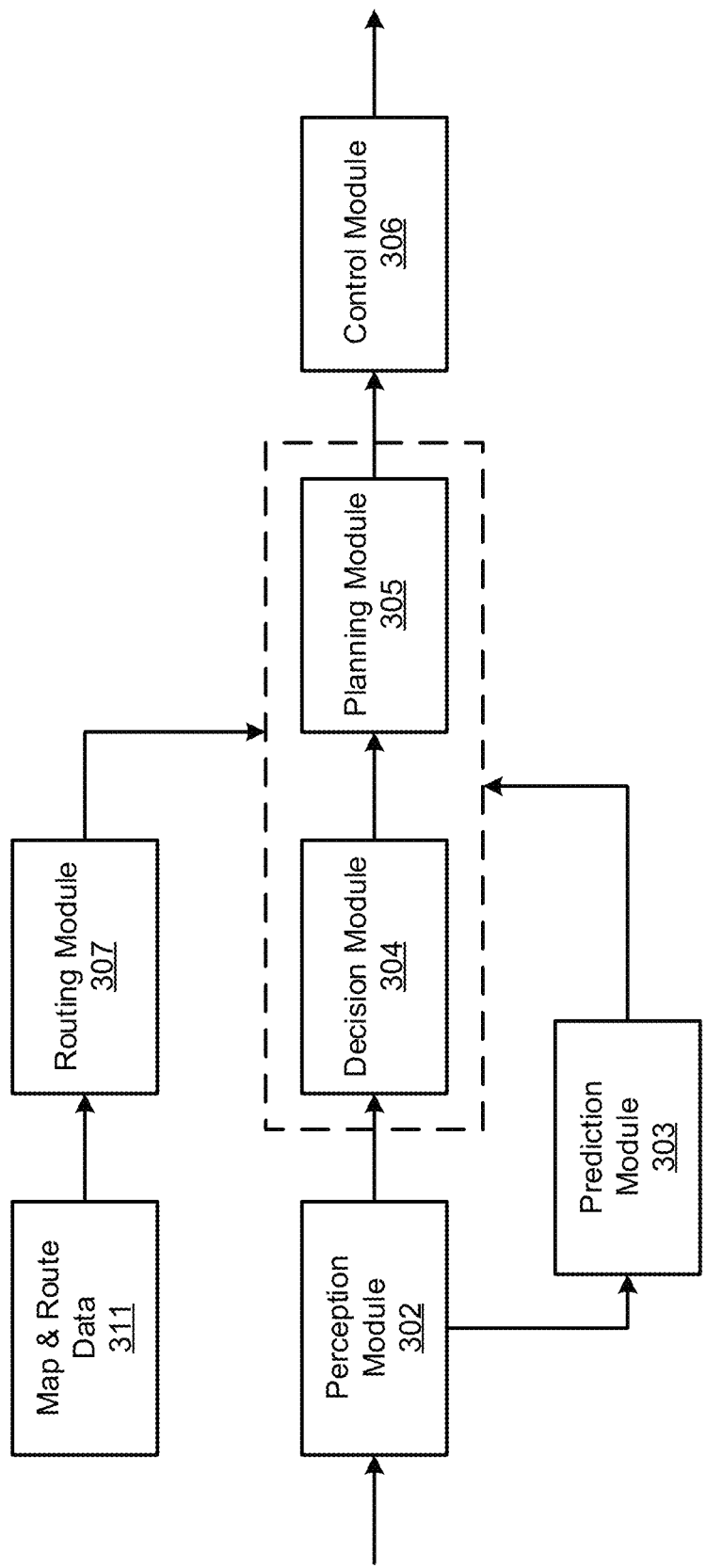

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307. Routing module 307 may include on-lane mode module I 308a and open-space-mode module I 309a Planning module 305 may include on-lane mode module II 308b and open-space-mode module II 309b.

Some or all of modules 301-309b may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 II may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. In one embodiment, routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle). In one embodiment, planning module 305 may use a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph. In one embodiment, planning module 305 may generate a reference line based on a route provided by the routing module 307.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
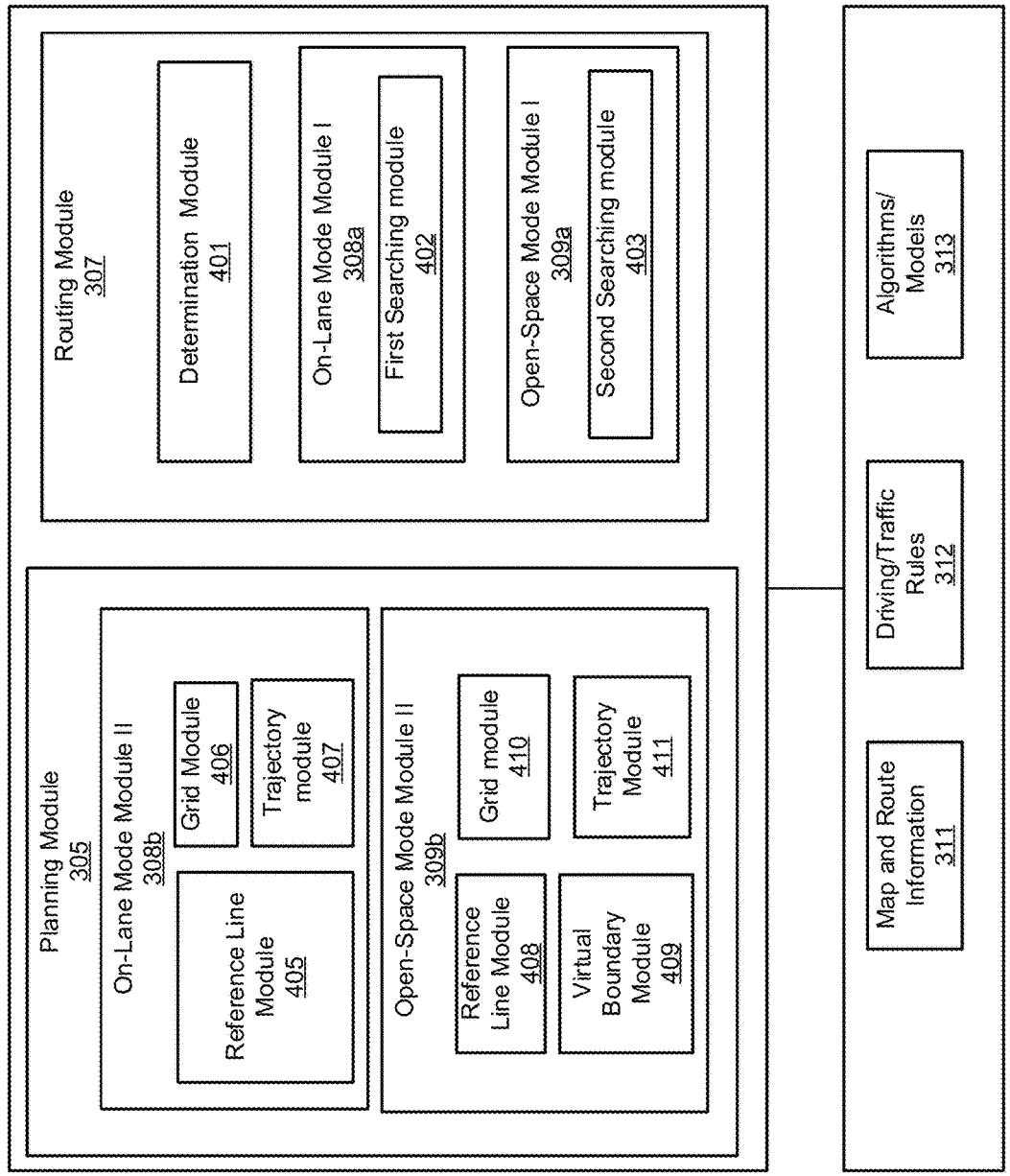
FIG. 4 is a block diagram illustrating an example of a routing module and a planning module according to one embodiment.
Figure 5A:
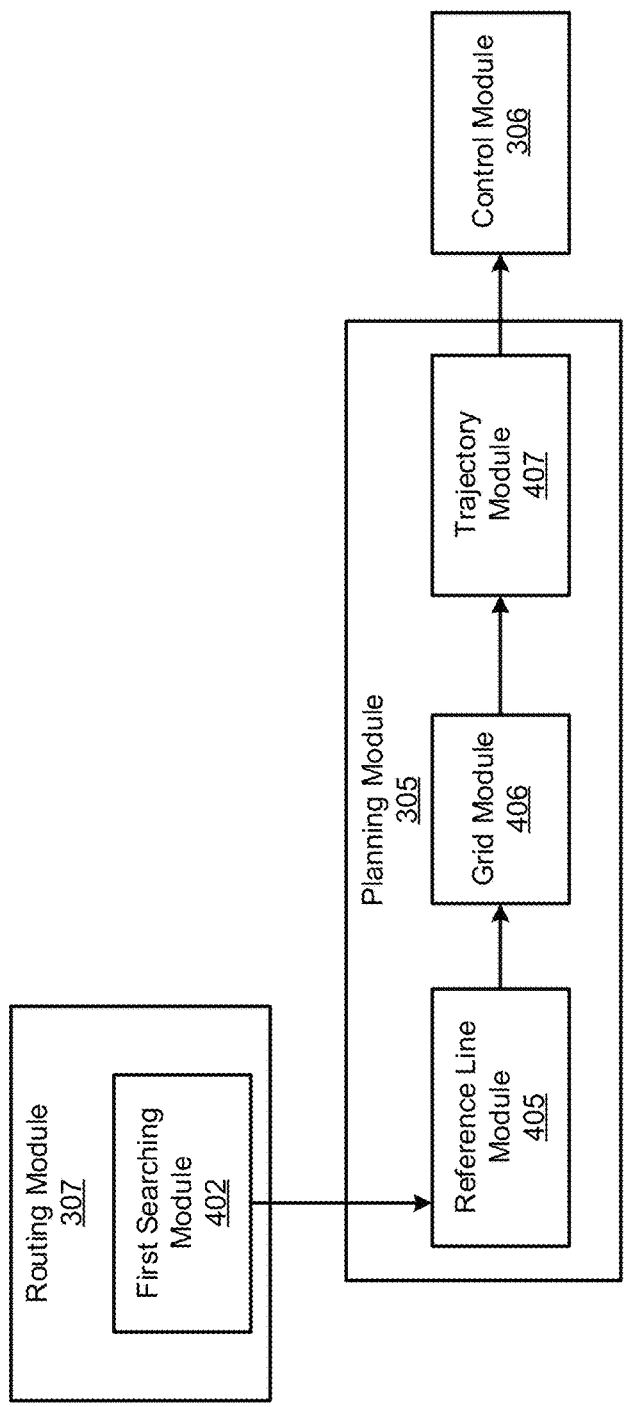
FIG. 5A is a processing flow diagram illustrating an example of operating in an on-lane mode according to one embodiment.
Figure 5B:
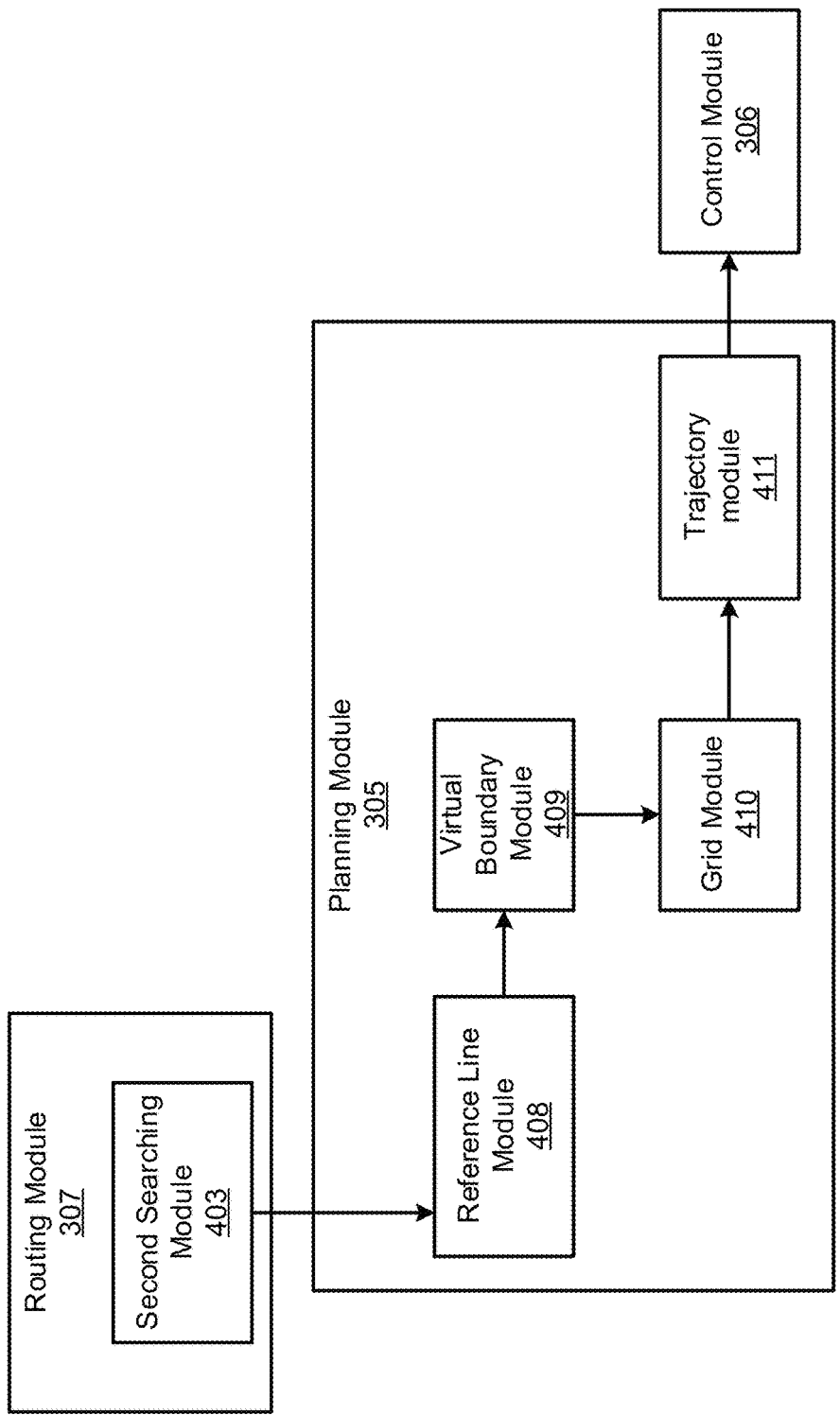
FIG. 5B is a processing flow diagram illustrating an example of operating in an open-space mode according to one embodiment.

FIG. 4 is a block diagram illustrating an example of a routing module 307 and a planning module 305 according to one embodiment. FIG. 5A is a processing flow diagram illustrating an example of operating in an on-lane mode according to one embodiment. FIG. 5B is a processing flow diagram illustrating an example of operating in an open-space mode according to one embodiment. Referring to FIGS. 4, 5A and 5B, according to one embodiment, routing module 307 includes, but not being limited to, determination module 401, on-lane mode module I 308a including a first searching module 402 and open-space-mode module I 309a including a second searching module 403. Determination module 401 is configured to determine a starting point and an ending point of a route along which the ADV is to be driven. Determination module 401 is further configured to determine whether each of the starting point and the ending point is within a first driving area of a first type having a lane boundary or a second driving area of a second type as an open space that is without a lane boundary. Determination module 401 is further configured to divide the route into a first route segment and a second route segment based on the determining whether each of the starting point and the ending point is within the first driving area or the second driving area. Routing module 307 and/or planning module 305 operate in one of an on-lane mode or an open-space mode to plan a first trajectory for the first route segment and operating in one of the on-lane mode or the open-space mode to plan a second trajectory for the second route segment, dependent upon whether the starting point or the ending point is within the first driving area or the second driving area.

Referring to FIGS. 4 and 5A, in one embodiment, first searching module 402 is configured to search for the first route segment or the second route segment based on A-star searching algorithm. Reference line module 405 is configured to generate a reference line based on the first route segment or the second route segment. Grid module 406 is configured to generate a grid based on the reference line. Trajectory module 407 is configured to determine a set of candidate trajectories based on the grid and to select a trajectory from the set of candidate trajectories to control the ADV to autonomously drive according to the trajectory.

Referring to FIGS. 4 and 5B, in one embodiment, second searching module 403 is configured to search for the first route segment or the second route segment based on a modified A-star searching algorithm. Reference line module 408 is configured to generate a reference line based on the first route segment or the second route segment. Virtual boundary line module 409 is configured to generate a virtual road boundary based on a width of the ADV and the reference line. Grid module 410 is configured to generate a grid based on the reference line within the virtual road boundary. Trajectory module 411 is configured to determine a set of candidate trajectories based on the grid and to select a trajectory from the set of candidate trajectories to control the ADV to autonomously drive according to the trajectory.

Figure 6:
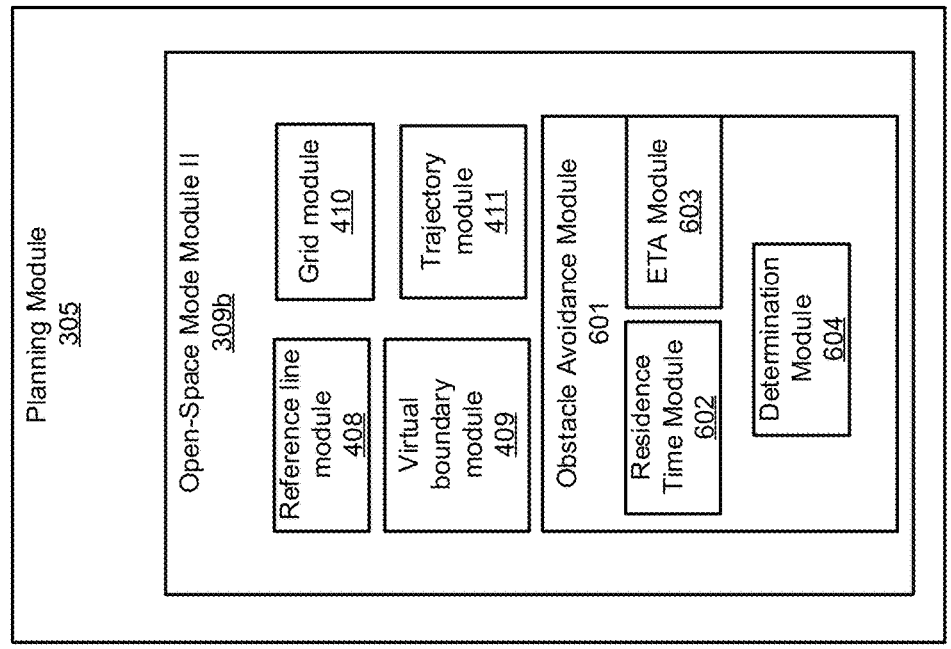
FIG. 6 is a block diagram illustrating an example of a routing module and a planning module including an obstacle avoidance module according to one embodiment.
Figure 7:
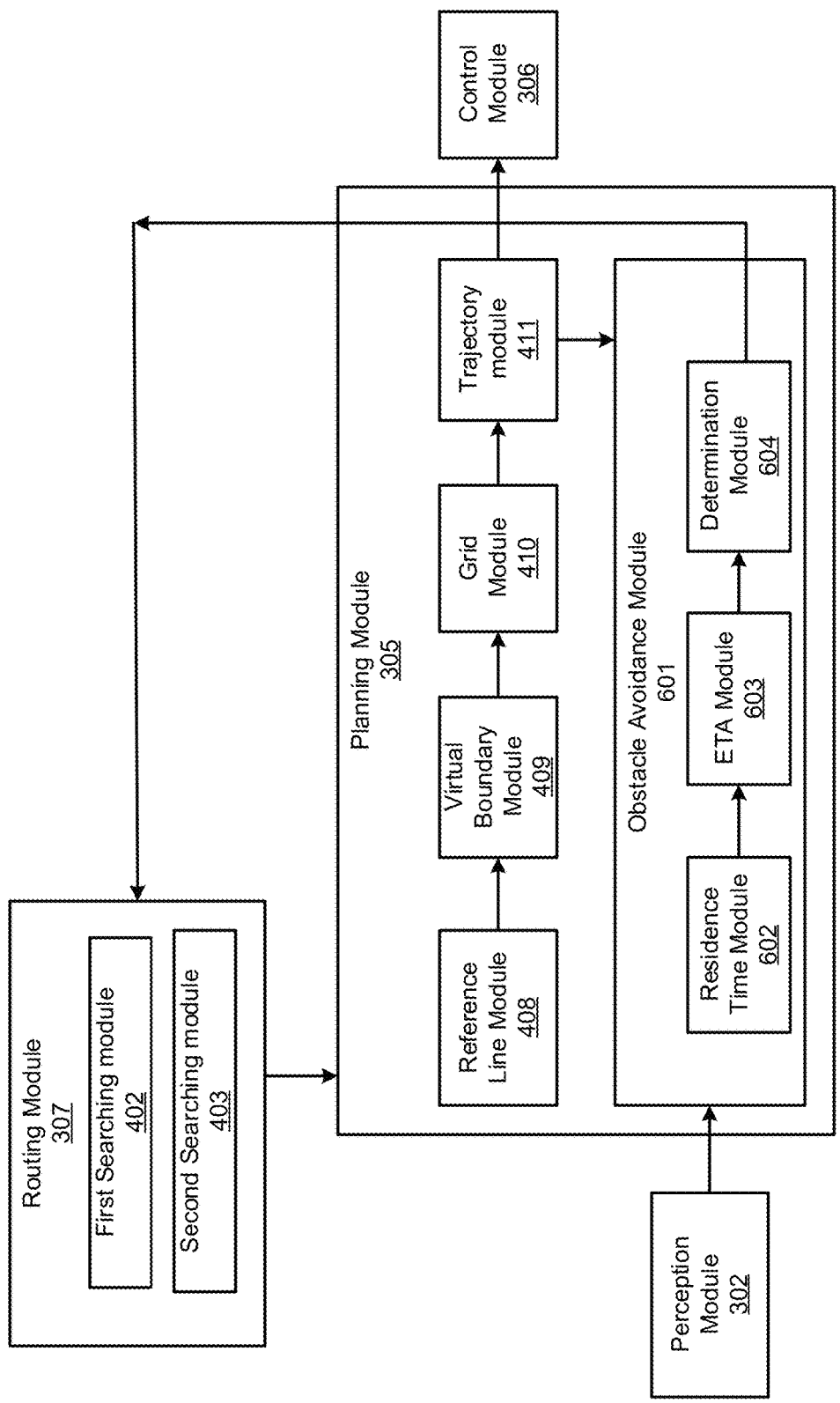
FIG. 7 is a processing flow diagram illustrating an example of obstacle avoidance according to one embodiment.

FIG. 6 is a block diagram 600 illustrating an example of a planning module 305 including an obstacle avoidance module according to one embodiment. FIG. 7 is a processing flow diagram illustrating an example of obstacle avoidance according to one embodiment. Referring to FIGS. 6 and 7, according to one embodiment, planning module 305 may include obstacle avoidance module 601. Obstacle avoidance module 601 may include residence time module 602, estimated time of arrival (ETA) module 603, and determination module 604.

Perception module 302 may be configured to detect an obstacle in an affected region of the ADV based on sensor data obtained from a plurality of sensors mounted on the ADV. Residence time module 602 is configure to determine an expected residence time of the obstacle in the affected region. ETA module 603 is configured to determine a first estimated time of arrival for the ADV to wait for the obstacle to leave the affected region and to autonomously drive along the first trajectory afterwards and determine a second estimated time of arrival for the ADV to autonomously drive along the second trajectory. Determination module 604 is configured to determine whether to plan a second trajectory or to wait for the obstacle to leave the affected region based on the expected residence time of the obstacle in the affected region. Determination module 604 is further configured to plan a second trajectory for the ADV to drive along and controlling the ADV to autonomously drive along the second trajectory, or controlling the ADV to wait for the obstacle to leave the affected region and to autonomously drive along the first trajectory afterwards, based on the determining whether to plan a second trajectory or to wait for the obstacle to leave the affected region.

In one embodiment, the ADV is configured to operate in an open-space mode in a driving area as an open space that is without a lane boundary. In one embodiment, a probability of a residence time of the obstacle in the first region is determined, and where the expected residence time of the obstacle in the affected region is determined based on the probability of the residence time. In one embodiment, a ratio of the first estimated time of arrival over the second estimated time of arrival is determined, where the determining whether to plan a second trajectory or to wait for the obstacle to leave the affected region is further based on the ratio of the first estimated time of arrival over the second estimated time of arrival.

In one embodiment, in response to the ratio of the first estimated time of arrival over the second estimated time of arrival is larger than 1, determination module 604 is configured to determine to plan a second trajectory. In one embodiment, in order to plan the second trajectory, second searching module 403 is configured to search for another first route segment or another second route segment based on a modified A-star searching algorithm. Reference line module 408 is configured to generate another reference line based on the another first route segment or the another second route segment. Virtual boundary line module 409 is configured to generate another virtual road boundary based on a width of the ADV and the another reference line. Grid module 410 is configure to generate another grid based on the another reference line within the another virtual road boundary. Trajectory module 411 is configured to determine another set of candidate trajectories based on the another grid and to select the second trajectory from the another set of candidate trajectories to control the ADV to autonomously drive according to the second trajectory.

FIGS. 8A-8D illustrate examples of an ADV 810 drives in a first driving area 801 having a lane boundary and/or a second driving area 802 as an open space that is without a lane boundary. The ADV 810 may need to drive in both road driving scenarios with lane boundaries and free space driving scenarios without lane boundaries. It is important for the ADV 810 to have the capacity of automatically driving in a road driving scenario, e.g., driving in a driving area with specified lane boundary as well as automatically driving in a free space scenario, e.g., driving a driving area as an open free space without a lane boundary, and even the capacity of smart switch between those two different driving areas. Conventional motion planning method for the road driving scenario may require a topology map and specific lane boundaries. Thus, the conventional motion planning method for the road driving scenario is difficult to deal with the complex scenarios such as parking, three-points-turn and obstacles avoidance with a combination of forward and backward trajectories. Conventional free space path planning method is slow to generate a trajectory in real-time, and may lead to a poor performance in obstacles avoidance. For the road driving scenario, DP and QP have been used for trajectory planning. However, sometimes autonomous vehicles may have to drive from a start point to an end point only in a specified free space area without a lane boundary. For the free space scenario, Reeds-Shepp path combined with hybrid A-star searching algorithm has been used for path planning to generate an expected trajectory. Unfortunately, this free space path planning method is too slow to generate the trajectory in real-time, and may lead to a poor performance of obstacles avoidance.

Currently, A-star searching algorithm is used to find a navigation path from a start point to an end point, and then a reference line is generated base on the navigation path, then real-time path planning is performed with DP and/or QP. However, this searching algorithm may only work well for the road scenario with a topology map and a specific road boundary. This searching algorithm is difficult to deal with the complex scenarios such as parking, three-points-turn and obstacles avoidance with the combination of forward and backward trajectories. There have been efforts to increase a size of node in this searching algorithm to reduce time consume of path searching. However, this approach may sometime lead to a bad result, for example, an expected path can't be found even if all of the nodes have been searched. The current path planning does not smooth the trajectory and uses the coarse trajectory directly, which may be difficult for vehicle to follow.

For a specified start point and end point, in current method, path planning for a trajectory is performed only once instead of planning each cycle, which may avoid a large time consumption for path planning in real-time. But the current method is not good enough for obstacle avoidance, because the ADV does not change the trajectory to avoid a collision with an obstacle.

According to some embodiments, disclosed herein is a new method for trajectory planning suitable for both a city road with a specified road boundary and a free space area. This method gives a combination of A* searching algorithm and hybrid A* searching algorithm for navigation path searching according to different type of driving scenarios. For a city road, A* searching algorithm may be used to get to a navigation path and for an open free space, a hybrid A* searching algorithm may be used. The navigation path with A-star searching algorithm and/or hybrid A-star searching algorithm may be used to generate a reference line for real-time trajectory planning with DP or QP algorithm. This trajectory planning method can be used to deal with complex driving tasks, such as driving from a city road to a free space area or driving from a free space to a city road. The method may further have a good performance in obstacle avoidance.

Figure 8A:
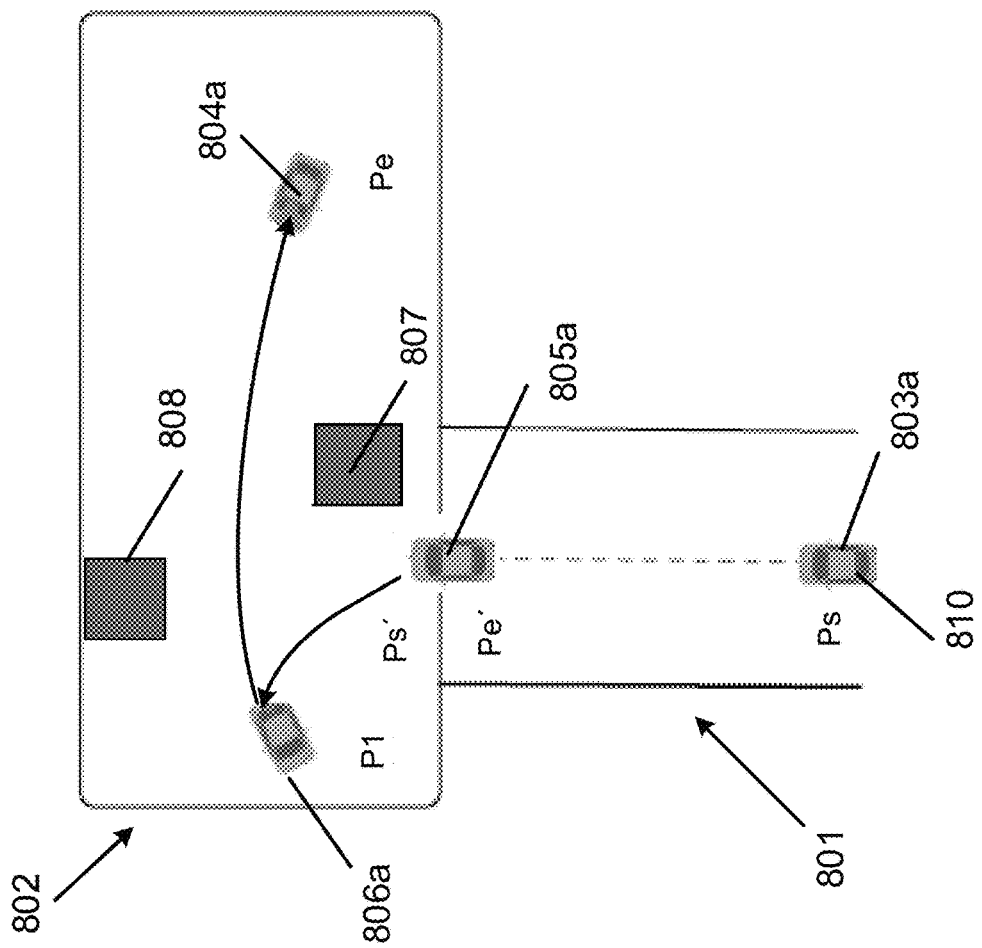
FIGS. 8A-8D illustrate examples of an ADV drives in a first driving area having a lane boundary and/or a second driving area as an open space that is without a lane boundary.
Figure 8B:
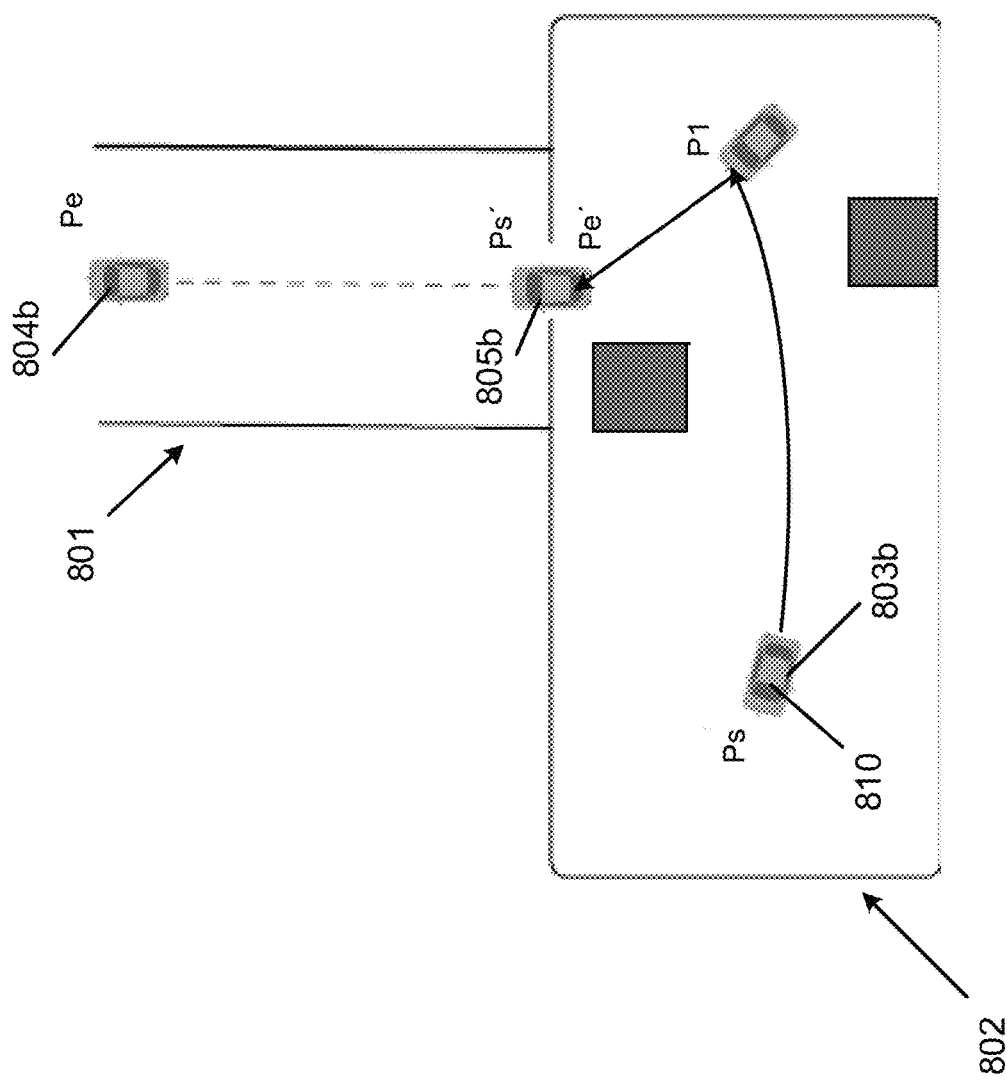
Figure 8C:
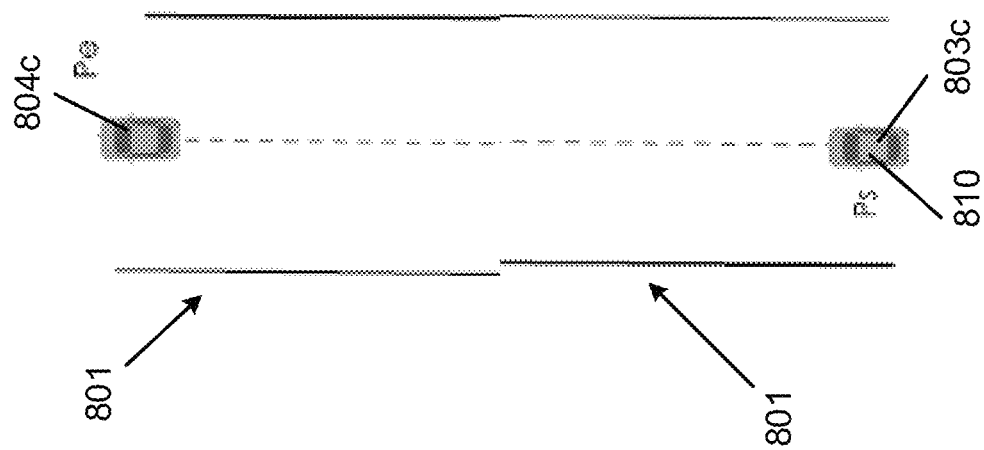
Figure 8D:
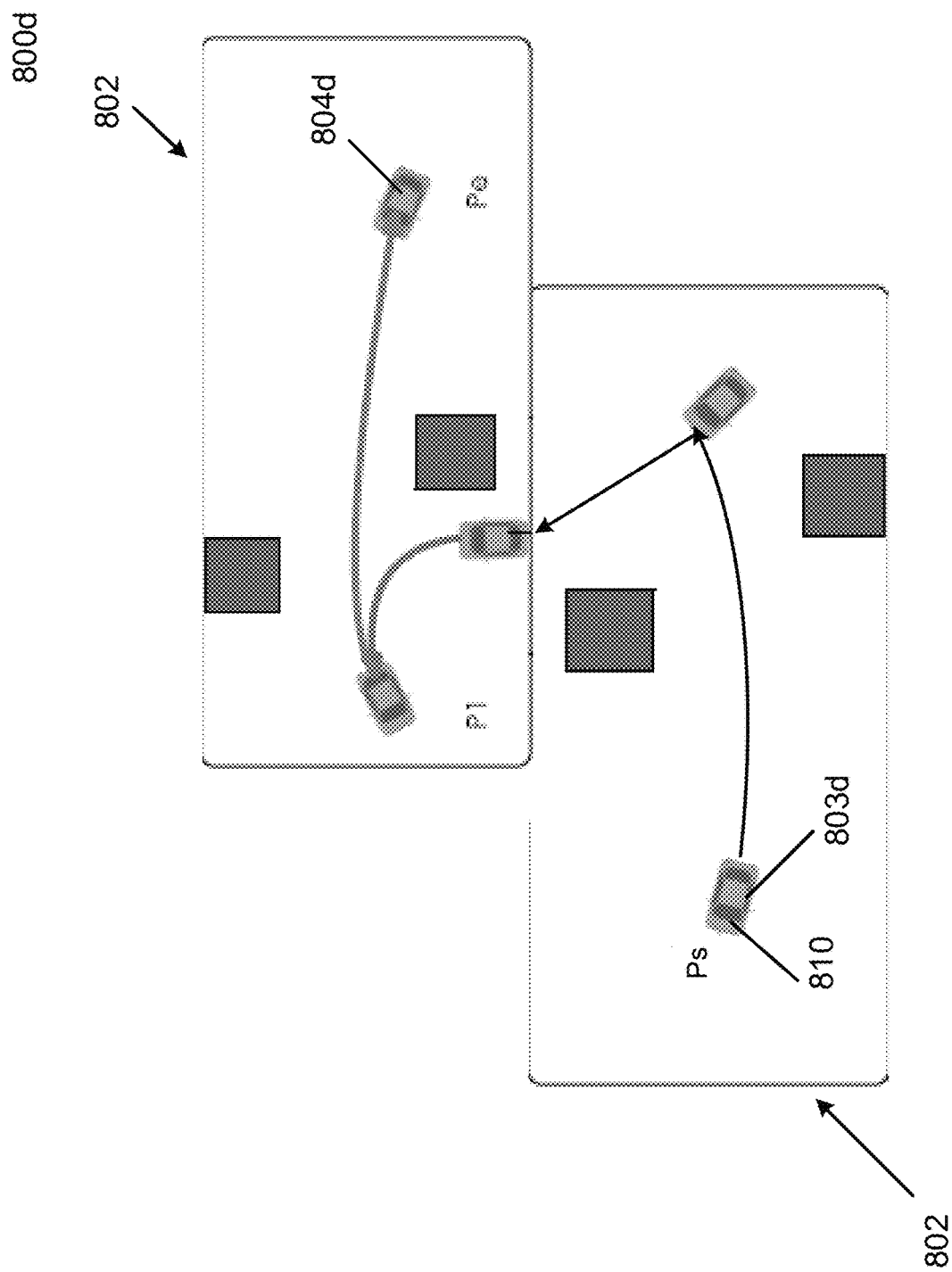

As illustrated in FIGS. 8A-8D, there are four situations according to whether each of a start point Ps and an end point Pe of the ADV 810 is within the first driving area 801 having a lane boundary or a second driving area 802 as an open space without a lane boundary. FIG. 8A is a diagram 800*a* illustrating a first situation that the starting point Ps 803*a* is within the first driving area 801 and the ending point Pe 804*a* is within the second driving area 802. FIG. 8B is a diagram 800*b* illustrating a second situation that the starting point Ps 803*b* is within the second driving area 802 and the ending point Pe 804*b* is within the first driving area 801. FIG. 8C is a diagram 800*c* illustrating a third situation that the starting point Ps 803*c* is within the first driving area 801 and the ending point Pe 804*c* is within the first driving area 801. FIG. 8D is a diagram 800*d* illustrating a fourth situation that the starting point Ps 803*d* is within the second driving area 802 and the ending point Pe 804*d* is within the second driving area 802.

The method for trajectory planning is provided to deal with the four situations. In this method, there are two procedures, a first procedure and a second procedure. In the first procedure, the ADV 810 is configured to operate in an on-lane mode. In the second procedure, the ADV 810 is configured to operate in an open-space mode.

As illustrated in FIG. 8A, in the first situation, the starting point Ps 803*a* is in a road scenario (e.g., the first driving area 801) and the ending point Pe 804*a* is in a free space (e.g., the second driving area 802). A route with the starting point Ps 803*a* and the ending point Pe 804*a* may be divided into a first route segment and a second route segment by an intermediate point. In one embodiment, a nearest point Pe' 805*a* (Xe', Ye', Phie') to the ending point Pe in the road scenario (e.g., the first driving area 801) may be determined. The nearest point Pe' 805*a* may be the intermediate point to divide the route into the two route segments. Trajectory planning may be performed from the starting point Ps 803*a* to the nearest point Pe' 805*a*, which is the first route segment, with the procedure 1 and from the nearest point Pe' (Ps') 805*a* to the ending point Pe 804*a*, which is the second route segment, with the procedure 2. In the first situation, the ADV 810 is configured to operate in the on-lane mode to plan a first trajectory for the first route segment and operate in the open-space mode to plan a second trajectory for the second route segment.

As illustrated in FIG. 8B, in the second situation, the starting point Ps 803*b* is in a free open space (e.g., the second driving area 802) and the ending point Pe 804*b* is in a road scenario (e.g., the first driving area 801). A route with the starting point Ps 803*b* and the ending point Pe 804*b* may be divided into a first route segment and a second route segment by an intermediate point. In one embodiment, a nearest point Pe' 805*b* (Xe', Ye', Phie') to the starting point Ps in the road scenario (e.g., the first driving area 801) may be determined. The nearest point Ps' 805*b* may be the intermediate point to divide the route into the two route segments. Trajectory planning may be performed from the starting point Ps 803*a* to the nearest point Ps' (Pe') 805*b*, which is the first route segment, with the procedure 2 and from the nearest point Ps' 805*b* to the ending point Pe 804*b*, which is the second route segment, with the procedure 1. In the second situation, the ADV 810 is configured to operate in the open-space mode to plan a first trajectory for the first route segment and operate in the on-lane mode to plan a second trajectory for the second route segment.

As illustrated in FIG. 8C, in the third situation, the starting point Ps 803*c* is in the road scenario (e.g., the first driving area 801) and the ending point Pe 804*c* is in the road scenario (e.g., the first driving area 801). It is not necessary to divide a route from the starting point Ps 803*c* to the ending point Pe 804*c* in this situation. In one embodiment, trajectory planning may be performed from the starting point Ps 803*c* to the ending point Pe 804*c* with the procedure 1. In one embodiment, the route with the starting point Ps 803*c* and the ending point Pe 804*c* may be divided into a first route segment and a second route segment by any intermediate point. The ADV 810 is configured to operate in the on-lane mode to plan a first trajectory for the first route segment and operate in the on-lane mode to plan a second trajectory for the second route segment.

As illustrated in FIG. 8D, in the fourth situation, the starting point Ps 803*d* is in the free open space (e.g., the second driving area 802) and the ending point Pe 804*c* is in the free open space (e.g., the second driving area 802)). It is not necessary to divide a route from the starting point Ps 803*d* to the ending point Pe 804*d* in this situation. In one embodiment, trajectory planning may be performed from the starting point Ps 803*d* to the ending point Pe 804*d* with the procedure 2. In one embodiment, the route with the starting point Ps 803*d* and the ending point Pe 804*d* may be divided into a first route segment and a second route segment by any intermediate point. The ADV 810 is configured to operate in the open-space mode to plan a first trajectory for the first route segment and operate in the open-space mode to plan a second trajectory for the second route segment.

Referring to FIG. 5A and FIGS. 8A-8D, in the first procedure, the ADV 810 is configured to operate in the on-lane mode. In one embodiment, first searching module 402 is configured to search a route for the first route segment or the second route segment based on an A-star searching algorithm. The route is a navigation course from a start point to an end point. A-star (A*) searching algorithm is an informed search algorithm. Starting from a starting node of a graph, A-star aims to find a route or a path to a destination node having the smallest cost (least distance travelled, shortest time, etc.). A-star searching does this by maintaining a tree of paths originating at the start node and extending those paths one edge at a time until its termination criterion is satisfied. At each iteration of its main loop, A-star determines which of its paths to extend based on the cost of the path and an estimate of the cost required to extend the path all the way to the goal node. Specifically, A-star selects the path that minimizes $$f(n)=g(n)+h(n)$$

where n is a next node on the path, g(n) is the cost of the path from the start node to n node, and h(n) is a heuristic function that estimates the cost of the shortest path from n to the goal node. A-star search terminates when the path it chooses to extend is a path from the start node to the goal node or if there are no paths eligible to be extended. The heuristic function is problem-specific.

In the first procedure, the A-star searching algorithm is used to search for the route for the first route segment or the second route segment, for example, by first searching module 402. The route may be referred to as Route 1. A reference line may be generated based on Route 1, e.g., by reference line module 405, and the reference line may be referred to as Reference line 1. Then, a grid may be generated according to Reference line 1 by grid module 406. A series of candidate trajectories based on quantic polynomial curve may be created by trajectory module 407. Then, trajectory module 407 may be further configured to use dynamic programming algorithm to get the expected trajectory from the candidate trajectories. Afterwards, the control module 306 may be configured to control the ADV 810 to follow the generated trajectory and move to the end point Pe (e.g., 804*a*, 804*b*, 804*c*, 804*d*).

Referring to FIG. 5B and FIGS. 8A-8D, in the second procedure, the ADV 810 is configured to operate in the open-space mode. In one embodiment, second searching module 403 is configure to search a route for the first route segment or the second route segment based on a modified A-star or hybrid A-star searching algorithm. The modified A-star or hybrid A-star searching algorithm is a variant of the A-star search algorithm applied to the 3D kinematic state space of the ADV, but with a modified state-update rule that captures continuous-state data in the discrete search nodes of A-star. Just as in A-star search algorithm, the search space (x, y, θ) is discretized, but unlike traditional A-star which only allows visiting centers of cells, the modified or hybrid-state A-star search algorithm associates with each grid cell a continuous 3D state of the vehicle. The modified or hybrid-state A-star search algorithm uses the kinematic model of the ADV. For example, three angles including maximum steer left, maximum steer right, and forward may be simulated in the modified or hybrid-state A-star search algorithm. For another example, the dimensions (length, width, or height) of the ADV may be considered in the modified or hybrid-state A-star search algorithm. The resulting route or path from the modified or hybrid-state A-star search algorithm is to be drivable, rather than being piecewise-linear as in the case of A-star search algorithm.

In the second procedure, the ADV 810 is operating in the open-space mode. There are 6 main operations (operation 1~operation 6) in the second procedure, and operation 7 is optional. Each operation is described as below.

Operation 1: The modified A-star or hybrid A-star searching algorithm is used to search for the route for the first route segment or the second route segment, for example, by second searching module 403. As illustrated by diagram 900*a* in FIG. 9A, the hybrid A-star or modified A-star may be used to search a route path from Ps' 805*a* to Pe 804*a* in the specified free space area 802 (e.g., the second driving area), which may be referred to as free space region of interest. The route may be referred to as Route 2. Route 2 may include a forward movement from Ps' 805*a* to P1 806*a* and a backward movement from P1 806*a* to Pe 804*a*. There may be two obstacles (e.g., 807, 808) in the free space area 802.

Operation 2: A reference line may be generated based on Route 2, e.g., by reference line module 408, and the reference line may be referred to as Reference line 2 based on Route 2.

Operation 3: A virtual road boundary (sample region of interest or ROI) may be created according to the width of the ADV and Reference line 2 generated at operation 2. In one embodiment, virtual boundary line module 409 is configured to generate the virtual road boundary based on a width of the ADV and Reference line 2. For example, Sample Region of Interest: $\{-(1+C)W/2,(1+C)W/2\}$.

W is the width of the ADV and C is a lateral expand ratio which is a real number bigger than 0.

As illustrated in FIG. 9A, a virtual road boundary 901 may be generated by virtual boundary line module 409 for the ADV 810 in the open space 802.

Operation 4: A grid may be generated according to Reference line 2 in the range of sample region of interest, by grid module 410. As illustrated in FIG. 9A, a grid 902 may be generated by grid module 410 in the open space 802. Each grid cell is associated or assigned a cost, using a predetermined cost function, based on a relative position with respect to the ADV and/or one or more obstacles identified within the corresponding ROI.

Operation 5: A series of candidate trajectories based on quantic polynomial curve may be created by trajectory module 411. The trajectory module 411 is further configured to use dynamic programming algorithm to get the expected trajectory from the candidate trajectories. As illustrated by diagram 900*b* in FIG. 9B, a trajectory 908 including a forward movement and a backward movement from a start point 903 to an end point 904 may be generated by trajectory module 411 in the open space 802.

Operation 6: Control module 306 is configured to control the ADV 810 to follow the generated trajectory 908 and move to the end point Pe (e.g., 804*a*, 804*b*, 804*c*, 804*d*, 904).

Operation 7: Determination module 604 (as illustrated in FIGS. 6 and 7) is configured to make decision if the ADV 810 should wait at a current position or return back to Operations 1-6 and re-plan the trajectory. The details of this operation to avoid obstacle will be described in details below.

Figure 10:
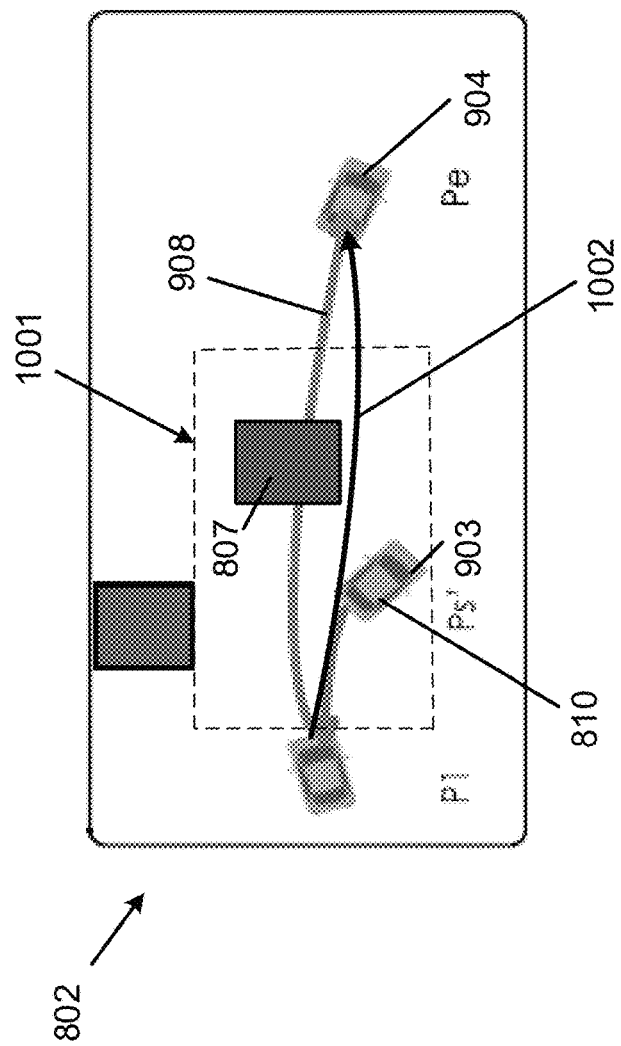
FIG. 10 illustrate an example of an ADV encounters an obstacle blocking a movement of the ADV.

FIG. 10 is a diagram 1000 illustrating an example of the ADV 810 encountering an obstacle 807 blocking a movement of the ADV. For a specified start point (e.g., Ps' 903) and an end point (e.g., Pe 904) in an open-space driving area (e.g., 802), current path planning for a trajectory is performed only once instead of planning each cycle, which may avoid the issue of a large time consumption for path planning in real-time. But the current path planning is not good enough for obstacle avoidance, because the ADV 810 does not change the trajectory to avoid a collision with an obstacle (e.g., a vehicle, a bicycle, a pedestrian, or an animal). A new method for obstacle avoidance is disclosed herein. According to one embodiment, the process includes determining a probability of a residence time of the obstacle (e.g., a vehicle, a bicycle, a pedestrian, or an animal) in an affected region of the ADV, calculating the expected residence time of a dynamic obstacle in the affected region, and making a decision whether the ADV should wait or should re-plan when the ADV encounters the obstacle blocking a movement of the ADV. By this method, the issue of obstacle avoidance can be addressed. The ADV can plan an optimum route to avoid the obstacle and arrive at the end point time efficiently.

Referring to FIG. 10, a first trajectory 908 may be planned for the ADV 810 to drive along, for example, by performing the operations 1-5 as discussed above. The ADV 810 may follow the generated trajectory 908 to move to the end point Pe 904. During the route, the ADV 810 may detect the obstacle 807 in an affected region 1001 of the ADV 810 based on sensor data obtained from a plurality of sensors mounted on the ADV. For example, the affected region 1001 of the ADV 810 may be a region the plurality of sensors mounted on the ADV 810 can sense. For example, the affected region 1001 of the ADV 810 may be a region that affects the movement of the ADV 810 along the trajectory 908 the ADV is driving. The affected region 1001 may be in a shape of a rectangular, a trapezoid, a triangle, a circle, or any other shape. For example, the affected region 1001 may have a dimension of 5 m×10 m, 10 m×20 m, etc.

When the ADV 810 is configured to plan the first route, the obstacle 807 may not block the movement along the trajectory 908 of the ADV 810. However, the obstacle 807 may be a dynamic obstacle such as a vehicle, a pedestrian, or an animal. The obstacle 807 may move towards the trajectory 908 as illustrated in FIG. 10 and block the movement of the ADV 810 along the trajectory 908.

Figure 11:
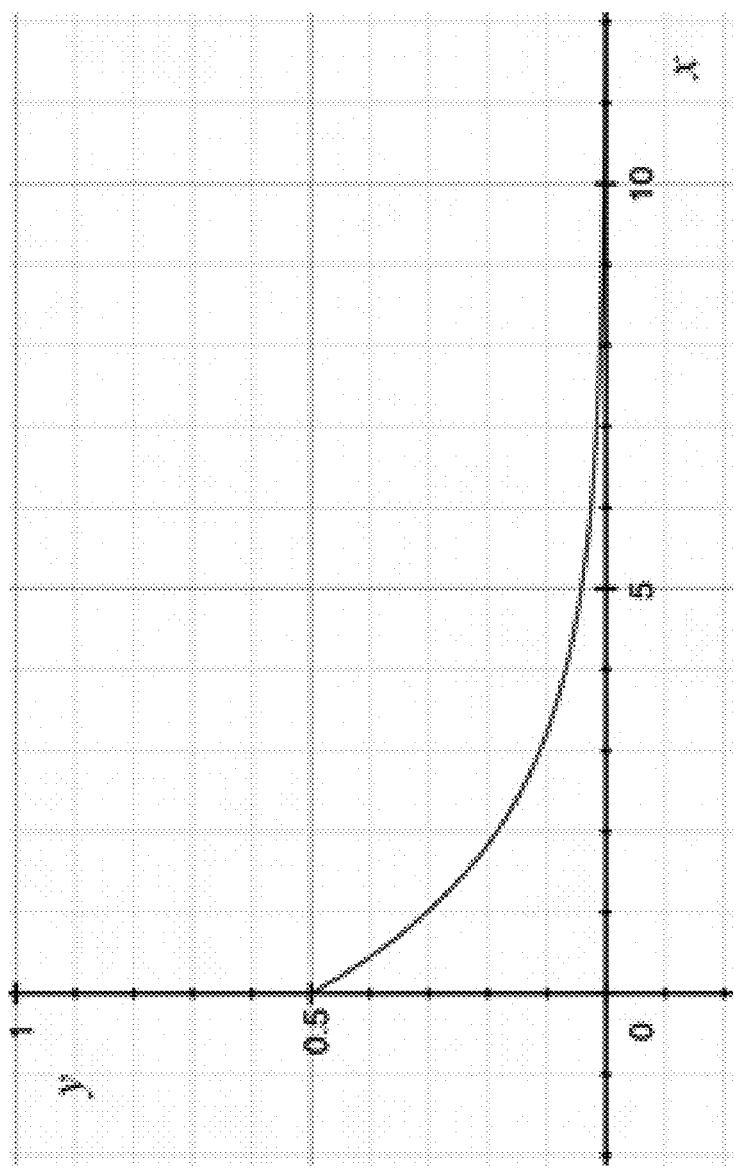
FIG. 11 is a diagram illustrating a probability density function of dynamic obstacles residence time in an affected region.

FIG. 11 is a diagram illustrating a probability density function of a dynamic obstacle residence time in an affected region. The probability density function (also referred to as a probability density graph or curve) as shown is specifically configured based on a set of one or more parameters that describe or represent a particular driving scenario (e.g., a parking area, an intersection) and the type of an obstacle (e.g., vehicle, bicycle, pedestrian) and its behavior, etc. As illustrated in FIG. 11, X axis represents a time or predicted time of an obstacle stays in the affected region 1001 (e.g., region of interest or ROI), and Y axis represents a probability density of the obstacle stays in the affected region 1001. FIG. 11 illustrates the probability density of the obstacle changes over time within which the obstacle stays within the affected region. In probability theory, a probability density function (PDF), or density of a continuous random variable, is a function whose value at any given sample (or point) in the sample space (the set of possible values taken by the random variable) can be interpreted as providing a relative likelihood that the value of the random variable would equal that sample. In a more precise sense, the PDF is used to specify the probability of the random variable falling within a particular range of values. This probability is given by the integral of this variable's PDF over that range. That is, it is determined based on the area under the density function but above the horizontal axis and between the lowest and greatest values of the range (e.g., the area between the curve and the X axis and the Y axis within a time period, for example, from zero to a particular time). The probability density function is nonnegative everywhere, and its integral over the entire space is equal to 1.

Referring to FIGS. 7, 10 and 11, in one embodiment, an expected residence time of the obstacle 807 in the affected region 1001 may be determined. It may be assumed that the dynamic obstacles' residence time in the affected region of the ADV follows a probability density function as below:

$$f(x)=\lambda e^{-\lambda x},$$

where $\lambda$ is a parameter of residence time probability density function associated with a dynamic obstacle (e.g., a moving obstacle). A value of $\lambda$ can be estimated by historical driving data in real-world, which may be determined or selected from a set of preconfigured $\lambda$ parameters dependent upon the specific driving scenario at the point in time. The mean or average residence time under the same or similar driving scenario may be represented as $1/\lambda$. The $\lambda$ parameter may be determined based on a large amount of prior driving statistics data collected from a variety of vehicles driving under the same or similar circumstances. The $\lambda$ parameter will determine the shape and size of the probability density curve, where FIG. 11 shows a probability density of a particular $\lambda$.

According to one embodiment, the probability of residence time in the range of 0~Tw may be calculated by integrating the above probability density function over a time range from a start time=0 to the expected residence time. The probability of residence time may be determined by:

$$P(0<x<Tw)=1-e^{-\lambda w},$$

where Tw is expected residence time of dynamic obstacles.

In one embodiment, the probability of residence time bigger than a predetermined probability threshold, such as, e.g., P=0.8 or 80%, may be accepted. The expected residence time of the dynamic obstacle 807 in the affected region 1001 may be calculated based on the probability of the residence time. In one embodiment, residence time module 602 is configured to determine the expected residence time of the obstacle 807 in the affected region 1001. In one embodiment, if a predetermined or acceptable probability (e.g., 80%) is utilized, given a $\lambda$ parameter determined or selected at the point in time, the expected resident time Tw can be calculated using the probability density function or probability density curve above. In one embodiment, the $\lambda$ parameter may be dynamically calculated or determined via a lookup operation on a set of $\lambda$ parameters previously configured and maintained by the ADV based on the specific driving scenario. For example, $\lambda$ parameter may be determined based on the affected region or ROI, such as, for example, a parking area, an intersection, etc. In addition, $\lambda$ parameter may be determined based on the type of an obstacle interested. The $\lambda$ parameter may be different if the obstacle is a vehicle, a bicycle, a pedestrian, or a pet. The $\lambda$ parameter may be different based on the behavior of the obstacle. For example, the $\lambda$ parameter may be different if the obstacle is fast moving vs. slow moving, a heading direction, a past moving trajectory, or a predicted trajectory.

If the obstacle 807 is a dynamic obstacle that can move by itself such as a vehicle, a bicycle, a pedestrian, a cat or a dog, the expected residence time of the dynamic obstacle 807 in the affected region 1001 may be calculated as:

$$Tw = \frac{-\ln(1-p)}{\lambda}$$

If the obstacle 807 is a static obstacle that cannot move by itself, the expected residence time is:

$$Tw=\infty$$

In one embodiment, a first estimated time of arrival T1 for the ADV 810 to wait for the obstacle 807 to leave the affected region 1001 and to autonomously drive along the first trajectory 908 afterwards may be determined, for example, by ETA module 603. A second estimated time of arrival T2 for the ADV 810 to re-plan and to autonomously drive along a second trajectory 1002 may be determined by the ETA module 603.

$$T1=T1m+T1w=L1/Ve+Tw,$$

$$T2=T2m=L2/Ve,$$

where T1 and T2 are the first and second estimate time of arrival of arriving or reaching the end point of the current trajectory 908 and re-plan the second trajectory 1002, respectively. T1m represents the time the ADV 807 takes to reach the end point of the current trajectory 908 without waiting. T1w represents a wait time that the ADV 807 has to wait if ADV 807 decides to move along the current trajectory 908 if the current trajectory 908 is blocked by the obstacle 807. T2m represents the time the ADV 807 takes to reach the end point of the second trajectory 1002. Ve is an average speed of the ADV 807 as planned when traveling along the respective trajectories. L1 and L2 represent a trajectory length of trajectories 908 and 1002, respectively.

In one embodiment, a ratio of the first estimated time of arrival T1 over the second estimated time of arrival T2 may be determined, for example, by determination module 604. Determination module 604 may be configured to determine whether to move along the second trajectory 1002 or the first trajectory 908 by waiting for the obstacle 807 to leave the affected region 1001 based on the ratio of the first estimated time of arrival T1 over the second estimated time of arrival T2.

$$R=T1/T2=(L1/Ve+Tw)/(L2/Ve)$$

According to one embodiment, if the ratio R is greater than a predetermined threshold, such as, for example, R>1, (e.g., the second estimated time of arrival T2 is shorter than the first estimated time of arrival T1) determination module 604 may determine to re-plan and return to operations 1-7. Determination module 604 may be configured to plan the second trajectory 1002 for the ADV 810 to drive along and controlling the ADV 810 to autonomously drive along the second trajectory 1002.

When R is not greater than the predetermined threshold, such as, for example, R<=1, (e.g., the first estimated time of arrival T1 is shorter than the second estimated time of arrival T2) determination module 604 may determine to continue to wait for the obstacle 807 to leave the affected region 1001 and to autonomously drive along the first trajectory 908 afterwards.

In one embodiment, an ADV operating in the on-lane mode in the first driving area (e.g., 801) may be configured to autonomously switch to the open-space mode in response to detecting the ADV is to be drive in the second driving area (e.g., 802). For example, referring back to FIG. 8A, when the ADV 810 arrives at the point 805a, perception module 302 may detect the ADV 810 is to be drive in the second driving area (e.g., 802). In response, the routing module 307 and the planning module 305 may be configured to automatically switch from operating in the on-lane mode following the first procedure to operating in the open-space mode following the second procedure.

Figure 12:
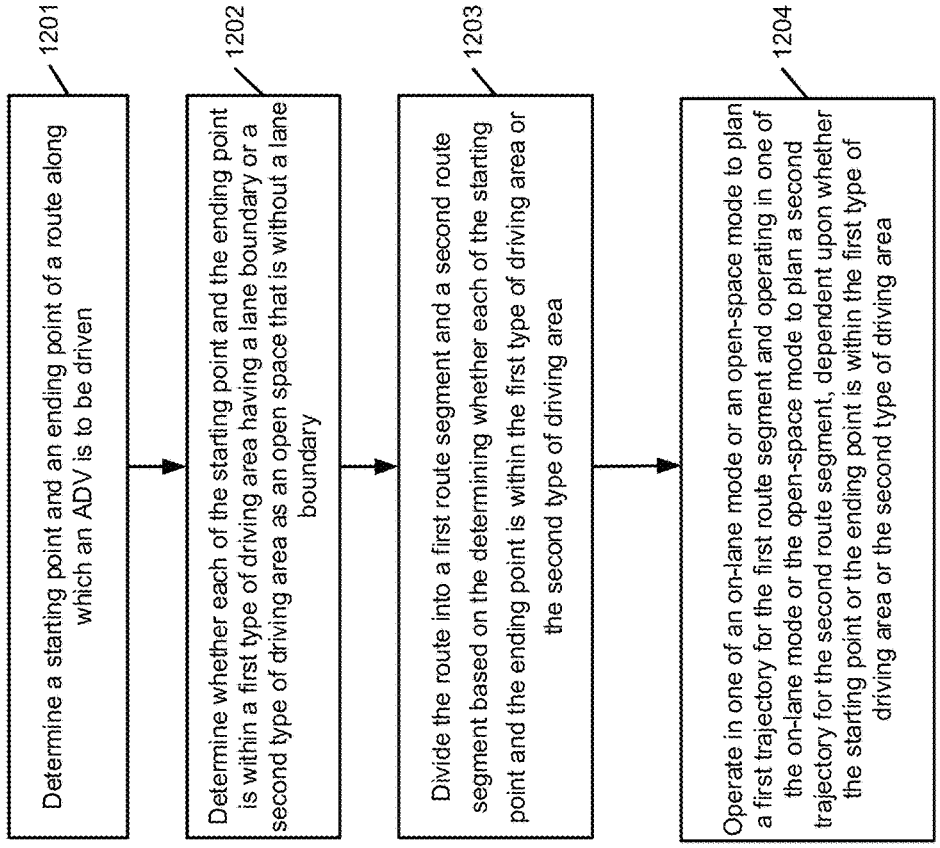
FIG. 12 is a flow diagram illustrating an example of a process for an ADV to operate in one of an on-lane mode or open-space mode according to one embodiment.

FIG. 12 is a flow diagram illustrating an example of a process for an ADV to operate in one of an on-lane mode or open-space mode according to one embodiment. Process 1200 may be performed by processing logic which may include software, hardware, or a combination thereof. For example, process 1200 may be performed by routing module 307 and planning module 305. Referring to FIG. 12, in operation 1201, processing logic determines a starting point and an ending point of a route along which the ADV is to be driven. In operation 1202, processing logic determines whether each of the starting point and the ending point is within a first driving area of a first type having a lane boundary or a second driving area of a second type as an open space that is without a lane boundary. In operation 1203, processing logic divides the route into a first route segment and a second route segment based on the determining whether each of the starting point and the ending point is within the first driving area or the second driving area. In operation 1204, processing logic operates in one of an on-lane mode or an open-space mode to plan a first trajectory for the first route segment and operates in one of the on-lane mode or the open-space mode to plan a second trajectory for the second route segment, dependent upon whether the starting point or the ending point is within the first driving area or the second driving area.

Figure 13:
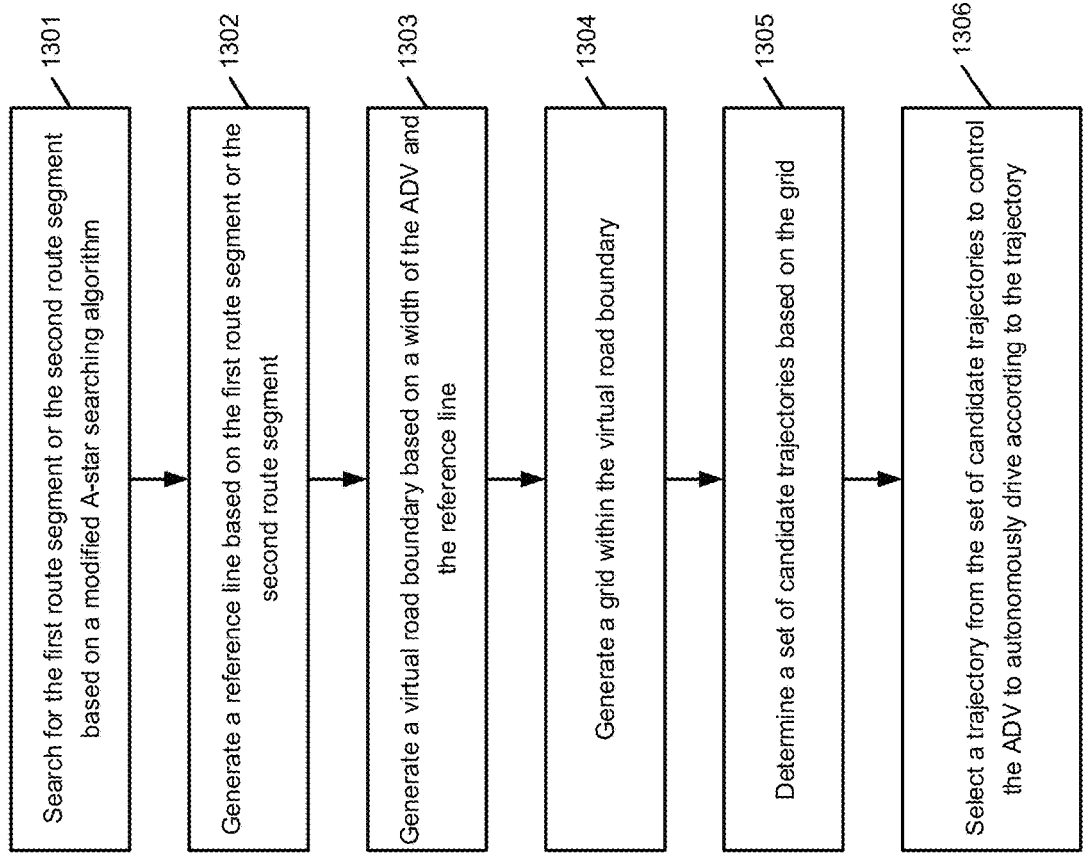
FIG. 13 is a flow diagram illustrating an example of a process for an ADV to operate in an open-space mode according to one embodiment.

FIG. 13 is a flow diagram illustrating an example of a process for an ADV to operate in an open-space mode according to one embodiment. Process 1300 may be performed by processing logic which may include software, hardware, or a combination thereof. For example, process 1300 may be performed by routing module 307 and planning module 305. Referring to FIG. 13, in operation 1301, processing logic searches for the first route segment or the second route segment based on a modified A-star searching algorithm. In operation 1302, processing logic generates a reference line based on the first route segment or the second route segment. In operation 1303, processing logic generates a virtual road boundary based on a width of the ADV and the reference line. In operation 1304, processing logic generates a grid within the virtual road boundary. In operation 1305, processing logic determines a set of candidate trajectories based on the grid. In operation 1306, processing logic selects a trajectory from the set of candidate trajectories to control the ADV to autonomously drive according to the trajectory.

Figure 14:
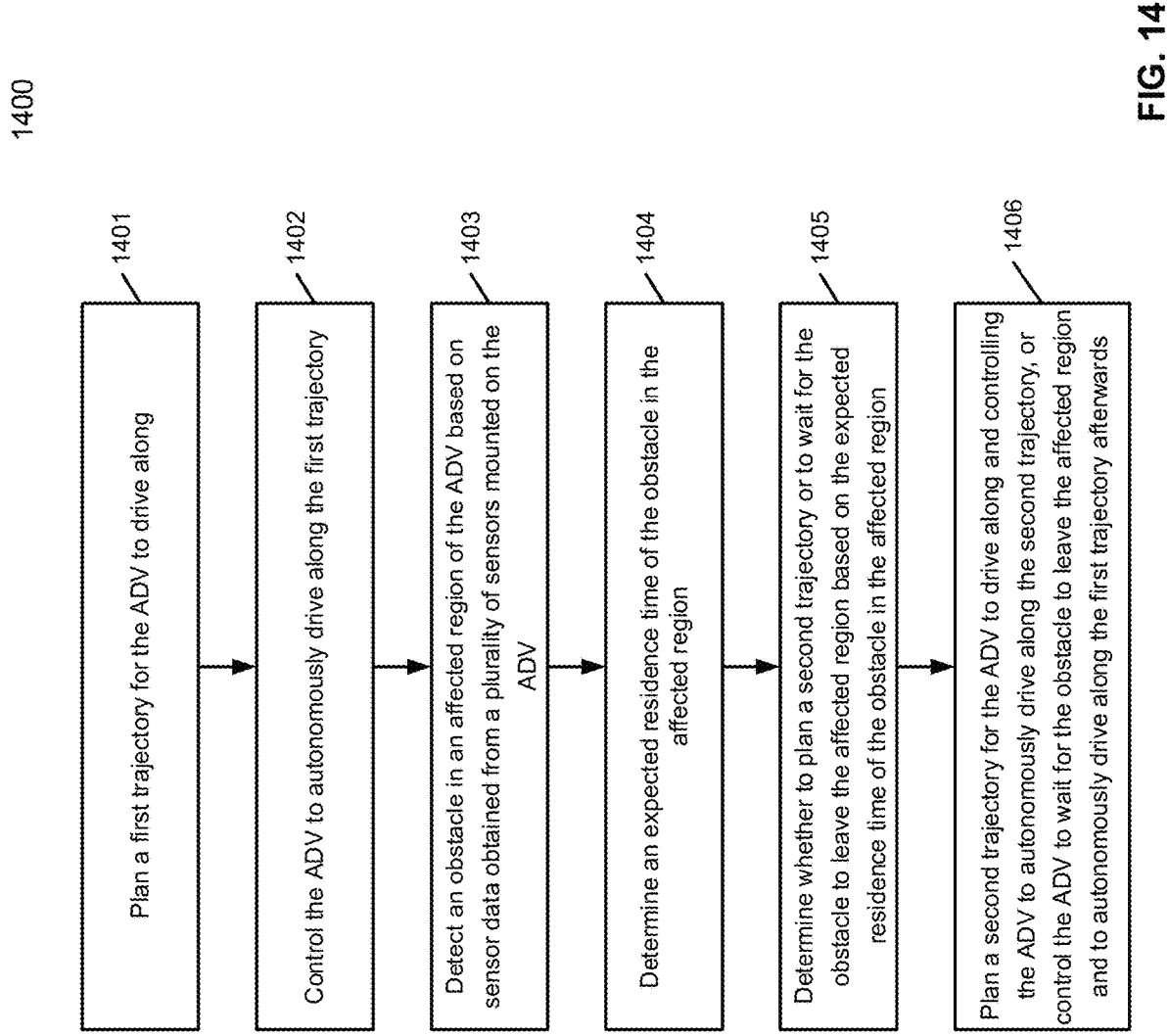
FIG. 14 is a flow diagram illustrating an example of a process for an ADV to avoid an obstacle according to one embodiment.

FIG. 14 is a flow diagram illustrating an example of a process for an ADV to avoid an obstacle according to one embodiment. Process 1400 may be performed by processing logic which may include software, hardware, or a combination thereof. For example, process 1400 may be performed by perception module 302, routing module 307, planning module 305 and control module 306. Referring to FIG. 14, in operation 1401, processing logic plans a first trajectory for the ADV to drive along. In operation 1402, processing logic controls the ADV to autonomously drive along the first trajectory. In operation 1403, processing logic detects an obstacle in an affected region of the ADV based on sensor data obtained from a plurality of sensors mounted on the ADV, while controlling the ADV to autonomously drive along a first trajectory. In operation 1404, processing logic determines an expected residence time of the obstacle in the affected region. In operation 1405, processing logic determines whether to plan a second trajectory or to wait for the obstacle to leave the affected region based on the expected residence time of the obstacle in the affected region. In operation 1406, processing logic plans a second trajectory for the ADV to drive along and controlling the ADV to autonomously drive along the second trajectory, or controls the ADV to wait for the obstacle to leave the affected region and to autonomously drive along the first trajectory afterwards, based on the determining whether to plan a second trajectory or to wait for the obstacle to leave the affected region.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

The invention claimed is:

1. A computer-implement method for operating an autonomous driving vehicle (ADV), the method comprising:
    determining a starting point and an ending point of a route along which the ADV is to be driven;
    determining whether each of the starting point and the ending point is within a first driving area of a first type having a lane boundary or a second driving area of a second type as an open space that is without a lane boundary;
    dividing the route into a first route segment and a second route segment, wherein the first route segment includes the starting point, and the second route segment includes the ending point; and
    operating in one of an on-lane mode or an open-space mode to plan a first trajectory for the first route segment and operating in one of the on-lane mode or the open-space mode to plan a second trajectory for the second route segment, dependent upon whether the starting point or the ending point is within the first driving area or the second driving area, wherein the ADV is to operate in the on-lane mode in the first driving area of the first type having the lane boundary, and wherein the ADV is to operate in the open-space mode in the second driving area of the second type as the open space that is without the lane boundary, wherein operating in the open- space mode includes:
        searching for the first route segment or the second route segment based on a modified A-star searching algorithm;
        generating a reference line based on the first route segment or the second route segment;
        generating a virtual road boundary based on a physical dimension of the ADV and the reference line;
        generating a grid within the virtual road boundary;
        determining a set of candidate trajectories based on the grid; and
        selecting a trajectory from the set of candidate trajectories to control the ADV to autonomously drive according to the trajectory.

2. The method of claim 1, further comprising:
    determining that the starting point is within the first driving area and the ending point is within the second driving area; and
    operating in the on-lane mode to plan a first trajectory for the first route segment and operating in the open-space mode to plan a second trajectory for the second route segment, in response to determining the starting point is within the first driving area and the ending point is within the second driving area.

3. The method of claim 2, further comprising determining an intermediate point that is a nearest point to the ending point and positioned within the first driving area, wherein the first route segment is from the starting point to the intermediate point and the second route segment is from the intermediate point to the ending point.

4. The method of claim 1, further comprising:
    determining that the starting point is within the second driving area and the ending point is within the first driving area; and
    operating in the open-space mode to plan a first trajectory for the first route segment and operating in the on-lane mode to plan a second trajectory for the second route segment, in response to determining the starting point is within the second driving area and the ending point is within the first driving area.

5. The method of claim 4, further comprising determining an intermediate point that is a nearest point to the starting point and positioned within the first driving area, wherein the first route segment is from the starting point to the intermediate point and the second route segment is from the intermediate point to the ending point.

6. The method of claim 1, further comprising:
    determining that the starting point is within the first driving area and the ending point is within the first driving area; and
    operating in the on-lane mode to plan a first trajectory for the first route segment and operating in the on-lane mode to plan a second trajectory for the second route segment, in response to determining the starting point is within the first driving area and the ending point is within the first driving area.

7. The method of claim 1, further comprising:
    determining that the starting point is within the second driving area and the ending point is within the second driving area; and
    operating in the open-space mode to plan a first trajectory for the first route segment and operating in the open-space mode to plan a second trajectory for the second route segment, in response to determining the starting point is within the second driving area and the ending point is within the second driving area.

8. The method of claim 1, wherein operating in the on-lane mode includes:
    searching for the first route segment or the second route segment based on an A-star searching algorithm;
    generating a reference line based on the first route segment or the second route segment;
    generating a grid based on the reference line;
    determining a set of candidate trajectories based on the grid; and
    selecting a trajectory from the set of candidate trajectories to control the ADV to autonomously drive according to the trajectory.

9. A non-transitory machine-readable medium having instructions stored therein, which when executed by a processor, cause the processor to perform operations, the operations comprising:
- determining a starting point and an ending point of a route along which an autonomous driving vehicle (ADV) is to be driven;
- determining whether each of the starting point and the ending point is within a first driving area of a first type having a lane boundary or a second driving area of a second type as an open space that is without a lane boundary;
- dividing the route into a first route segment and a second route segment, wherein the first route segment includes the starting point, and the second route segment includes the ending point; and
- operating in one of an on-lane mode or an open-space mode to plan a first trajectory for the first route segment and operating in one of the on-lane mode or the open-space mode to plan a second trajectory for the second route segment, dependent upon whether the starting point or the ending point is within the first driving area or the second driving area, wherein the ADV is to operate in the on-lane mode in the first driving area of the first type having the lane boundary, and wherein the ADV is to operate in the open-space mode in the second driving area of the second type as the open space that is without the lane boundary, wherein operating in the open-space mode includes:
  - searching for the first route segment or the second route segment based on a modified A-star searching algorithm;
  - generating a reference line based on the first route segment or the second route segment;
  - generating a virtual road boundary based on a physical dimension of the ADV and the reference line;
  - generating a grid within the virtual road boundary;
  - determining a set of candidate trajectories based on the grid; and
  - selecting a trajectory from the set of candidate trajectories to control the ADV to autonomously drive according to the trajectory.

10. The machine-readable medium of claim 9, wherein the operations further comprise:
- determining the starting point is within the first driving area and the ending point is within the second driving area; and
- operating in the on-lane mode to plan a first trajectory for the first route segment and operating in the open-space mode to plan a second trajectory for the second route segment, in response to determining the starting point is within the first driving area and the ending point is within the second driving area.

11. The machine-readable medium of claim 10, wherein the operations further comprise:
- determining an intermediate point that is a nearest point to the ending point and positioned within the first driving area, wherein the first route segment is from the starting point to the intermediate point and the second route segment is from the intermediate point to the ending point.

12. The machine-readable medium of claim 9, wherein the operations further comprise:
- determining the starting point is within the second driving area and the ending point is within the first driving area; and
- operating in the open-space mode to plan a first trajectory for the first route segment and operating in the on-lane mode to plan a second trajectory for the second route segment, in response to determining the starting point is within the second driving area and the ending point is within the first driving area.

13. The machine-readable medium of claim 12, wherein the operations further comprise: determining an intermediate point that is a nearest point to the starting point and positioned within the first driving area, wherein the first route segment is from the starting point to the intermediate point and the second route segment is from the intermediate point to the ending point.

14. The machine-readable medium of claim 9, wherein the operations further comprise:
- determining the starting point is within the first driving area and the ending point is within the first driving area; and
- operating in the on-lane mode to plan a first trajectory for the first route segment and operating in the on-lane mode to plan a second trajectory for the second route segment, in response to determining the starting point is within the first driving area and the ending point is within the first driving area.

15. The machine-readable medium of claim 9, wherein the operations further comprise:
- determining the starting point is within the second driving area and the ending point is within the second driving area; and
- operating in the open-space mode to plan a first trajectory for the first route segment and operating in the open-space mode to plan a second trajectory for the second route segment, in response to determining the starting point is within the second driving area and the ending point is within the second driving area.

16. A data processing system, comprising:
- a processor; and
- a memory coupled to the processor to store instructions, which when executed by the processor, cause the processor to perform operations, the operations including
  - determining a starting point and an ending point of a route along which an autonomous driving vehicle (ADV) is to be driven;
  - determining whether each of the starting point and the ending point is within a first driving area of a first type having a lane boundary or a second driving area of a second type as an open space that is without a lane boundary;
  - dividing the route into a first route segment and a second route segment, wherein the first route segment includes the starting point, and the second route segment includes the ending point; and
  - operating in one of an on-lane mode or an open-space mode to plan a first trajectory for the first route segment and operating in one of the on-lane mode or the open-space mode to plan a second trajectory for the second route segment, dependent upon whether the starting point or the ending point is within the first driving area or the second driving area, wherein the ADV is to operate in the on-lane mode in the first driving area of the first type having the lane boundary, and wherein the ADV is to operate in the open-space mode in the second driving area of the second type as the open space that is without the lane boundary, wherein operating in the open-space mode includes:

searching for the first route segment or the second route segment based on a modified A-star searching algorithm;

generating a reference line based on the first route segment or the second route segment;

generating a virtual road boundary based on a physical dimension of the ADV and the reference line;

generating a grid within the virtual road boundary;

determining a set of candidate trajectories based on the grid; and selecting a trajectory from the set of candidate trajectories to control the ADV to autonomously drive according to the trajectory.

17. The data processing system of claim 16, wherein the operations further include:

determining the starting point is within the first driving area and the ending point is within the second driving area; and operating in the on-lane mode to plan a first trajectory for the first route segment and operating in the open-space mode to plan a second trajectory for the second route segment, in response to determining the starting point is within the first driving area and the ending point is within the second driving area.

18. The data processing system of claim 17, wherein the operations further include: determining an intermediate point that is a nearest point to the ending point and positioned within the first driving area, wherein the first route segment is from the starting point to the intermediate point and the second route segment is from the intermediate point to the ending point.

19. The data processing system of claim 16, wherein the operations further include:

determining the starting point is within the second driving area and the ending point is within the first driving area; and operating in the open-space mode to plan a first trajectory for the first route segment and operating in the on-lane mode to plan a second trajectory for the second route segment, in response to determining the starting point is within the second driving area and the ending point is within the first driving area.

20. The data processing system of claim 19, wherein the operations further include: further comprising determining an intermediate point that is a nearest point to the starting point and positioned within the first driving area, wherein the first route segment is from the starting point to the intermediate point and the second route segment is from the intermediate point to the ending point.

21. The data processing system of claim 16, wherein the operations further include:

determining the starting point is within the first driving area and the ending point is within the first driving area; and operating in the on-lane mode to plan a first trajectory for the first route segment and operating in the on-lane mode to plan a second trajectory for the second route segment, in response to determining the starting point is within the first driving area and the ending point is within the first driving area.

22. The data processing system of claim 16, wherein the operations further include:

determining the starting point is within the second driving area and the ending point is within the second driving area; and operating in the open-space mode to plan a first trajectory for the first route segment and operating in the open-space mode to plan a second trajectory for the second route segment, in response to determining the starting point is within the second driving area and the ending point is within the second driving area.

* * * * *